US012563170B2

(12) United States Patent
Takahashi et al.

(10) Patent No.: US 12,563,170 B2
(45) Date of Patent: Feb. 24, 2026

(54) INFORMATION PROCESSING APPARATUS, INFORMATION PROCESSING METHOD, AND DISPLAY DEVICE

(71) Applicant: SONY GROUP CORPORATION, Tokyo (JP)

(72) Inventors: Naomasa Takahashi, Tokyo (JP); Ken Ootsuka, Tokyo (JP)

(73) Assignee: SONY GROUP CORPORATION, Tokyo (JP)

( * ) Notice: Subject to any disclaimer, the term of this patent is extended or adjusted under 35 U.S.C. 154(b) by 109 days.

(21) Appl. No.: 18/547,704

(22) PCT Filed: Jan. 12, 2022

(86) PCT No.: PCT/JP2022/000718
§ 371 (c)(1),
(2) Date: Aug. 24, 2023

(87) PCT Pub. No.: WO2022/185719
PCT Pub. Date: Sep. 9, 2022

(65) Prior Publication Data
US 2024/0137480 A1     Apr. 25, 2024
US 2024/0236287 A9     Jul. 11, 2024

(30) Foreign Application Priority Data

Mar. 2, 2021     (JP) ................................. 2021-032220

(51) Int. Cl.
*H04N 13/327*          (2018.01)
*G09G 5/32*            (2006.01)
*H04N 13/349*          (2018.01)

(52) U.S. Cl.
CPC ............. *H04N 13/327* (2018.05); *G09G 5/32* (2013.01); *H04N 13/349* (2018.05); *G09G 2320/029* (2013.01)

(58) Field of Classification Search
CPC ...... H04N 13/327; H04N 13/349; H04N 5/66; G09G 2320/0261; G09G 2320/028;
(Continued)

(56) References Cited

U.S. PATENT DOCUMENTS

| 8,791,989 B2 * | 7/2014 | Ushio | ................. H04N 13/398 |
| | | | 348/51 |
| 10,002,555 B2 * | 6/2018 | Liu | .......................... G09G 3/20 |

(Continued)

FOREIGN PATENT DOCUMENTS

| CN | 107003596 A | * | 8/2017 | ........... G02F 1/1313 |
| CN | 113767307 B | * | 8/2023 | ........... G02B 3/0037 |

(Continued)

OTHER PUBLICATIONS

International Search Report and Written Opinion of PCT Application No. PCT/JP2022/000718, issued on Mar. 22, 2022, 10 pages of ISRWO.

*Primary Examiner* — Behrooz M Senfi
(74) *Attorney, Agent, or Firm* — CHIP LAW GROUP

(57)          ABSTRACT

The present technology relates to an information processing apparatus, an information processing method, and a display device that enable to accurately and easily recognize a shape and a pixel position of a display surface configured by multiple self-luminous display units. The information processing apparatus includes a communication unit that receives metadata regarding attributes and positions of multiple self-luminous display units comprising a display surface that displays a video image, and a recognition unit that recognizes a shape and a pixel position of the display surface on the basis of the metadata of each of the display units. The present technology can be applied to, for example, a display controller that controls display of an LED display.

22 Claims, 28 Drawing Sheets

(58) Field of Classification Search
CPC ..... G09G 2320/029; G09G 2340/0464; G09G
2356/00; G09G 2380/02; G09G 5/32
USPC .......................................................... 348/51
See application file for complete search history.

(56) References Cited

U.S. PATENT DOCUMENTS

| | | | |
|---|---|---|---|
| 2020/0184932 A1* | 6/2020 | Fujimori | .............. H04N 9/3179 |
| 2020/0327851 A1* | 10/2020 | Seo | ........................... G09G 3/32 |
| 2022/0013088 A1* | 1/2022 | Kikuta | ................... G09G 3/003 |

FOREIGN PATENT DOCUMENTS

| | | | | |
|---|---|---|---|---|
| JP | 2006-243360 A | 9/2006 | | |
| JP | 2012-083403 A | 4/2012 | | |
| JP | 2012-252276 A | 12/2012 | | |
| JP | 2013-187655 A | 9/2013 | | |
| JP | 2014157324 A * | 8/2014 | .............. | G09G 5/00 |
| JP | 2015-059948 A | 3/2015 | | |
| WO | WO-2009040717 A2 * | 4/2009 | .......... | H04N 13/047 |
| WO | 2017/104320 A1 | 6/2017 | | |

* cited by examiner

| TYPE OF PARAMETER | CONTENT OF PARAMETER |
|---|---|
| UID | ID |
| SHAPE | SHAPE |
| POSITION X | POSITION IN X DIRECTION |
| POSITION Y | POSITION IN Y DIRECTION |
| CURVATURE RADIUS X | CURVATURE RADIUS IN X DIRECTION |
| CURVATURE RADIUS Y | CURVATURE RADIUS IN Y DIRECTION |
| PIXEL PITCH | PIXEL PITCH |
| SIDE LENGTH 1 | LENGTH OF SIDE 1 |
| ⋯ | ⋯ |
| SIDE LENGTH n | LENGTH OF SIDE n |
| CONNECTION ANGLE 1 | ANGLE BETWEEN WITH DISPLAY UNIT ADJACENT TO SIDE 1 |
| ⋯ | ⋯ |
| CONNECTION ANGLE n | ANGLE BETWEEN WITH DISPLAY UNIT ADJACENT TO SIDE n |

| PARAMETER | VALUE |
|---|---|
| UID | 1 |
| SHAPE | OBLONG |
| POSITION X | 20 |
| POSITION Y | 11 |
| CURVATURE RADIUS X | 3000 |
| CURVATURE RADIUS Y | — |
| PIXEL PITCH | 1. 2 |
| SIDE LENGTH 1 | 400 |
| SIDE LENGTH 2 | 300 |
| SIDE LENGTH 3 | 400 |
| SIDE LENGTH 4 | 300 |
| CONNECTION ANGLE 1 | — |
| CONNECTION ANGLE 2 | — |
| CONNECTION ANGLE 3 | — |
| CONNECTION ANGLE 4 | — |

| PARAMETER | VALUE |
|---|---|
| UID | 2 |
| SHAPE | OBLONG |
| POSITION X | 21 |
| POSITION Y | 11 |
| CURVATURE RADIUS X | 3000 |
| CURVATURE RADIUS Y | — |
| PIXEL PITCH | 1. 2 |
| SIDE LENGTH 1 | 400 |
| SIDE LENGTH 2 | 300 |
| SIDE LENGTH 3 | 400 |
| SIDE LENGTH 4 | 300 |
| CONNECTION ANGLE 1 | — |
| CONNECTION ANGLE 2 | — |
| CONNECTION ANGLE 3 | — |
| CONNECTION ANGLE 4 | — |

| PARAMETER | VALUE |
|---|---|
| UID | 3 |
| SHAPE | OBLONG |
| POSITION X | 22 |
| POSITION Y | 11 |
| CURVATURE RADIUS X | 1500 |
| CURVATURE RADIUS Y | — |
| PIXEL PITCH | 1. 2 |
| SIDE LENGTH 1 | 400 |
| SIDE LENGTH 2 | 300 |
| SIDE LENGTH 3 | 400 |
| SIDE LENGTH 4 | 300 |
| CONNECTION ANGLE 1 | — |
| CONNECTION ANGLE 2 | — |
| CONNECTION ANGLE 3 | — |
| CONNECTION ANGLE 4 | — |

| PARAMETER | VALUE |
|---|---|
| UID | 4 |
| SHAPE | OBLONG |
| POSITION X | 23 |
| POSITION Y | 11 |
| CURVATURE RADIUS X | 1500 |
| CURVATURE RADIUS Y | — |
| PIXEL PITCH | 1. 2 |
| SIDE LENGTH 1 | 400 |
| SIDE LENGTH 2 | 300 |
| SIDE LENGTH 3 | 400 |
| SIDE LENGTH 4 | 300 |
| CONNECTION ANGLE 1 | — |
| CONNECTION ANGLE 2 | — |
| CONNECTION ANGLE 3 | — |
| CONNECTION ANGLE 4 | — |

FIG. 19

| PARAMETER | VALUE |
|---|---|
| UID | 3 |
| SHAPE | OBLONG |
| POSITION X | 20 |
| POSITION Y | 11 |
| CURVATURE RADIUS X | — |
| CURVATURE RADIUS Y | — |
| PIXEL PITCH | 1.2 |
| SIDE LENGTH 1 | 400 |
| SIDE LENGTH 2 | 300 |
| SIDE LENGTH 3 | 400 |
| SIDE LENGTH 4 | 300 |
| CONNECTION ANGLE 1 | — |
| CONNECTION ANGLE 2 | — |
| CONNECTION ANGLE 3 | — |
| CONNECTION ANGLE 4 | — |

| PARAMETER | VALUE |
|---|---|
| UID | 4 |
| SHAPE | OBLONG |
| POSITION X | 21 |
| POSITION Y | 11 |
| CURVATURE RADIUS X | — |
| CURVATURE RADIUS Y | — |
| PIXEL PITCH | 1.2 |
| SIDE LENGTH 1 | 400 |
| SIDE LENGTH 2 | 300 |
| SIDE LENGTH 3 | 400 |
| SIDE LENGTH 4 | 300 |
| CONNECTION ANGLE 1 | — |
| CONNECTION ANGLE 2 | — |
| CONNECTION ANGLE 3 | — |
| CONNECTION ANGLE 4 | 90 |

| PARAMETER | VALUE |
|---|---|
| UID | 5 |
| SHAPE | OBLONG |
| POSITION X | 22 |
| POSITION Y | 11 |
| CURVATURE RADIUS X | — |
| CURVATURE RADIUS Y | — |
| PIXEL PITCH | 1.2 |
| SIDE LENGTH 1 | 400 |
| SIDE LENGTH 2 | 300 |
| SIDE LENGTH 3 | 400 |
| SIDE LENGTH 4 | 300 |
| CONNECTION ANGLE 1 | — |
| CONNECTION ANGLE 2 | 90 |
| CONNECTION ANGLE 3 | — |
| CONNECTION ANGLE 4 | — |

| PARAMETER | VALUE |
|---|---|
| UID | 6 |
| SHAPE | OBLONG |
| POSITION X | 23 |
| POSITION Y | 11 |
| CURVATURE RADIUS X | — |
| CURVATURE RADIUS Y | — |
| PIXEL PITCH | 1.2 |
| SIDE LENGTH 1 | 400 |
| SIDE LENGTH 2 | 300 |
| SIDE LENGTH 3 | 400 |
| SIDE LENGTH 4 | 300 |
| CONNECTION ANGLE 1 | — |
| CONNECTION ANGLE 2 | — |
| CONNECTION ANGLE 3 | — |
| CONNECTION ANGLE 4 | — |

*FIG. 21*

| PARAMETER | VALUE |
|---|---|
| UID | 1 |
| SHAPE | TRIANGLE |
| POSITION X | 20 |
| POSITION Y | 11 |
| CURVATURE RADIUS X | 1500 |
| CURVATURE RADIUS Y | 1500 |
| PIXEL PITCH | 1.2 |
| SIDE LENGTH 1 | 400 |
| SIDE LENGTH 2 | 400 |
| SIDE LENGTH 3 | 400 |
| CONNECTION ANGLE 1 | — |
| CONNECTION ANGLE 2 | — |
| CONNECTION ANGLE 3 | — |

| PARAMETER | VALUE |
|---|---|
| UID | 2 |
| SHAPE | TRIANGLE |
| POSITION X | 21 |
| POSITION Y | 11 |
| CURVATURE RADIUS X | 1500 |
| CURVATURE RADIUS Y | 1500 |
| PIXEL PITCH | 1.2 |
| SIDE LENGTH 1 | 400 |
| SIDE LENGTH 2 | 400 |
| SIDE LENGTH 3 | 400 |
| CONNECTION ANGLE 1 | — |
| CONNECTION ANGLE 2 | — |
| CONNECTION ANGLE 3 | — |

INFORMATION PROCESSING APPARATUS, INFORMATION PROCESSING METHOD, AND DISPLAY DEVICE

CROSS REFERENCE TO RELATED APPLICATIONS

This application is a U.S. National Phase of International Patent Application No. PCT/JP2022/000718 filed on Jan. 12, 2022, which claims priority benefit of Japanese Patent Application No. JP 2021-032220 filed in the Japan Patent Office on Mar. 2, 2021. Each of the above-referenced applications is hereby incorporated herein by reference in its entirety.

TECHNICAL FIELD

The present technology relates to an information processing apparatus, an information processing method, and a display device, and particularly to an information processing apparatus, an information processing method, and a display device suitable for use when multiple self-luminous display units are combined to display a video image.

BACKGROUND ART

Conventionally, as a method of displaying a large screen video image, a projector method of projecting a video image on a screen is used (see, for example, Patent Document 1).

Furthermore, in recent years, an LED display that constructs a large-screen display by tiling multiple self-luminous display units using LEDs as pixels has also been used (see, for example, Patent Documents 2 and 3). The LED display can display a higher-luminance and higher-contrast video image as compared with the projector method.

CITATION LIST

Patent Document

Patent Document 1: International Publication No. 2017/104320
Patent Document 2: Japanese Patent Application Laid-Open No. 2015-59948
Patent Document 3: Japanese Patent Application Laid-Open No. 2012-83403

SUMMARY OF THE INVENTION

Problems to be Solved by the Invention

In order to geometrically correctly display a video image on the LED display as viewed from a user, it is necessary to accurately recognize a display surface of the LED display. That is, it is necessary to correctly recognize a shape and a pixel position of the display surface of the LED display, and geometrically correct (hereinafter, referred to as geometric correction) a video image to be displayed, in accordance with the shape and the pixel position of the display surface.

The present technology has been made in view of such a situation, and enables to accurately and easily recognize a shape and a pixel position of a display surface configured by multiple self-luminous display units.

Solutions to Problems

An information processing apparatus according to a first aspect of the present technology includes: a communication unit configured to receive metadata regarding attributes and positions of multiple display units of a self-luminous type, the multiple display units constituting a display surface configured to display a video image; and a recognition unit configured to recognize a shape and a pixel position of the display surface on the basis of the metadata of each of the display units.

An information processing method according to the first aspect of the present technology includes: receiving metadata regarding attributes and positions of multiple display units of a self-luminous type, the multiple display units constituting a display surface configured to display a video image; and recognizing a shape and a pixel position of the display surface on the basis of the metadata of each of the display units.

In the first aspect of the present technology, metadata is received regarding attributes and positions of multiple display units of a self-luminous type, the multiple display units constituting a display surface configured to display a video image, and a shape and a pixel position of the display surface are recognized on the basis of the metadata of each of the display units.

A display device according to a second aspect of the present technology includes: a display of a self-luminous type; a memory configured to store metadata related to an attribute and a position of the display; a connection unit connectable to another display device; and a transmission control unit configured to control transmission of the metadata to an information processing apparatus, the information processing apparatus being configured to recognize a shape and a pixel position of a display surface configured by the display and another display of the another display device.

In the second aspect of the present technology, controls is performed on transmission of metadata regarding an attribute and a position of a display to an information processing apparatus, the information processing apparatus being configured to recognize a shape and a pixel position of a display surface configured by the display of a self-luminous type and another display of the another display device.

BRIEF DESCRIPTION OF DRAWINGS

FIG. 8 is a block diagram illustrating an embodiment of a display controller to which the present technology is applied.

FIG. 12 is a view illustrating an example of a parameter table of the display unit.

FIG. 13 is a view illustrating an example of a developed view of the LED display.

FIG. 14 is a view illustrating an example of a setting method for a position X and a position Y of a display part.

FIGS. 16A and 16B are views schematically illustrating a configuration example of the display part.

FIG. 17 is a view illustrating a specific example of the parameter table.

FIG. 19 is a view illustrating a specific example of the parameter table.

FIG. 21 is a view illustrating a specific example of the parameter table.

FIG. 28 is a block diagram illustrating a configuration example of a computer.

MODE FOR CARRYING OUT THE INVENTION

Hereinafter, a mode for carrying out the present technology will be described. The description will be made in the following order.

1. Definition of terms
2. Basic description of LED display
3. Technical problem of LED display
4. Embodiment
5. Modification
6. Others

1. Definition of Terms

First, definitions of main terms used in the present specification will be described.

An LED display is a self-luminous display device including a display surface configured by combining display units which are display devices using, as a pixel, an LED which is a kind of light emitting element. For example, one LED display is configured by placing (tiling) multiple display units side by side to be adjacent to each other.

A user of the LED display is a person who views a video image displayed on the LED display, that is, an appreciator or a viewer. Whereas, a person who performs installation, setting, and the like of the LED display is referred to as a provider to be distinguished from the user who is an appreciator or a viewer.

A video image in three dimensions (hereinafter, referred to as a three-dimensional video image) means a video image having parallax according to a field of view (viewpoint) of the user. Therefore, an angle of view of the three-dimensional video image changes according to the field of view of the user. Examples of the three-dimensional video image include a full spherical video image and a free viewpoint video image.

Here, the viewpoint of the user is represented by coordinates in a three-dimensional space. Furthermore, the field of view of the user corresponds to a line-of-sight direction with reference to the viewpoint of the user.

A virtual space is a space that is generally defined in an application such as a game engine, and is for three-dimensionally handling data of a virtual object. For example, a field of view of the user is expressed as a virtual camera representing a position and an orientation of a head part or eyeballs of the user in the virtual space. The virtual space is represented by a coordinate system such as orthogonal coordinates or polar coordinates. Hereinafter, in the present specification, the virtual space is defined by orthogonal coordinates.

2. Basic Description of LED Display

Next, a configuration example of a known LED display will be described.

The LED display is constructed by arranging multiple display units in any shape. The display unit includes, for example, a display in which multiple pixels including red (R), green (G), and blue (B) LEDs are placed side by side.

Figure 1:
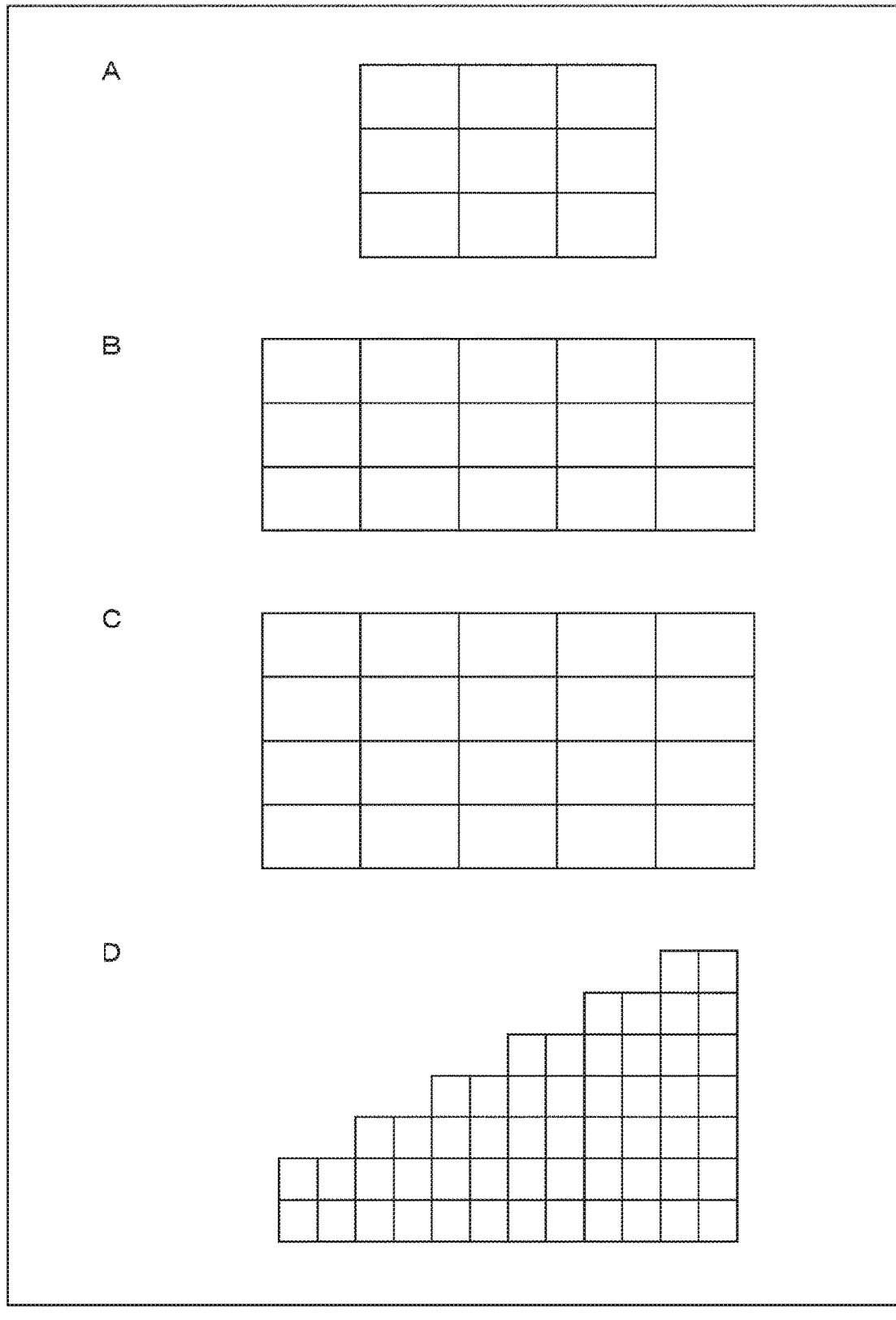
FIGS. 1A, 1B, 1C, and 1D are views illustrating a configuration example of an LED display.

For example, as illustrated in FIGS. 1A, 1B, and 1C, an LED display including a rectangular display surface as a whole is constructed by arranging multiple display units indicated by rectangular frames in a lattice pattern. In this case, any aspect ratio of the display surface of the LED display may be adopted. For example, the aspect ratio of the LED display is not limited to a ratio conforming to a conventional display such as 4:3 or 16:9, and can be set to various other ratios.

Furthermore, as illustrated in FIG. 1D, it is also possible to construct an LED display including a display surface having a shape other than a rectangle.

Moreover, by not only two-dimensionally arranging the display units as in the example of FIGS. 1A, 1B, 1C, and 1D but also three-dimensionally arranging the display units, an LED display including a display surface having a three-dimensional shape is constructed. Furthermore, by adopting a curved display unit or a bendable display unit, an LED display having a curved surface such as a cylindrical shape or a dome shape is constructed.

Note that, as the bendable display unit, for example, an organic light emitting diode (OLED) display or the like using a material having flexibility such as a silicon substrate is used.

Figure 2:
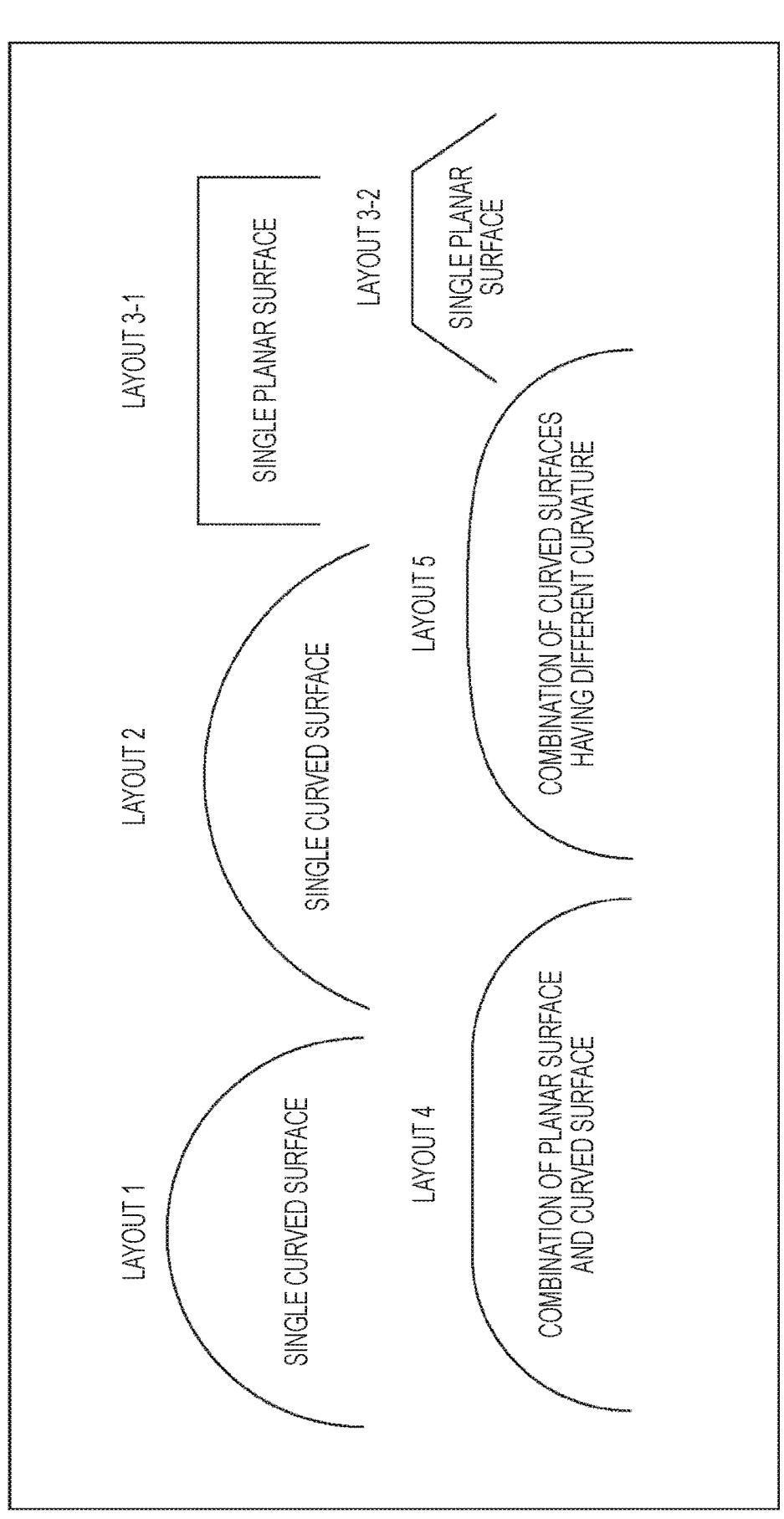
FIG. 2 is a view illustrating a configuration example of the LED display.
Figure 3:
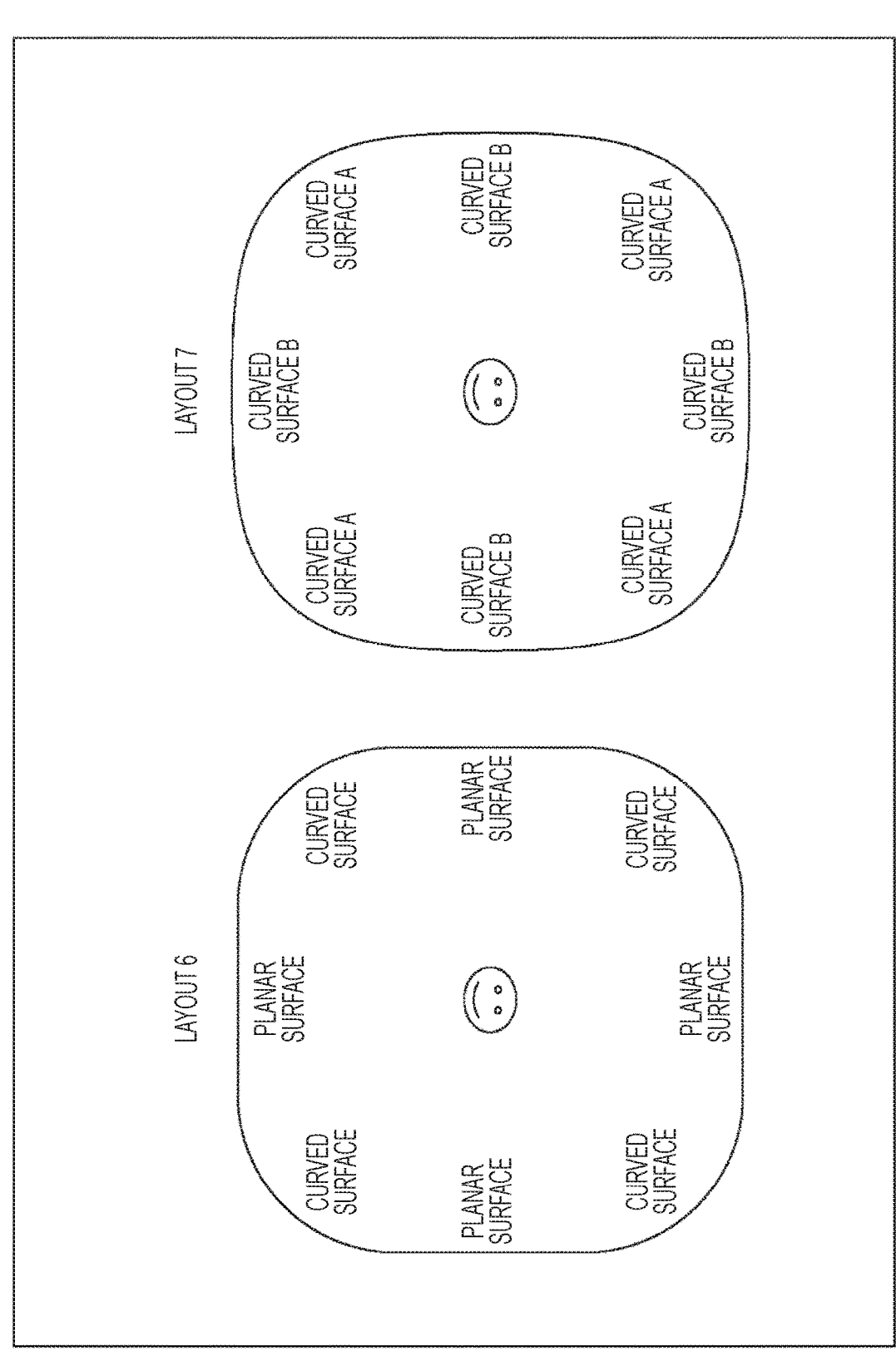
FIG. 3 is a view illustrating a configuration example of the LED display.

FIGS. 2 and 3 are schematic views of a layout when an LED display including a display surface having a three-dimensional shape is viewed from above.

Layouts 1 and 2 each illustrate an example of a layout of an LED display obtained by combining single (identically shaped) curved display units.

Layouts 3-1 and 3-2 each illustrate an example of a layout of an LED display obtained by combining single (identically shaped) planar display units.

Layout 4 illustrates an example of a layout of an LED display in which a planar display unit and a curved display unit are combined.

Layout 5 illustrates an example of a layout of an LED display in which curved display units having different curvatures (different shapes) are combined.

Layout 6 illustrates an example of a layout of an LED display configured to surround a user, in which a planar display unit and a curved display unit are combined.

Layout 7 illustrates an example of a layout of an LED display configured to surround the user, in which curved display units having different curvatures are combined.

In the Layouts 1, 2, and 4 to 7, the individual display units are smoothly connected, and a display surface having no corner is constructed. As a result, a video image is continuously displayed at a connection unit of the display units, and realistic feeling and immersive feeling of the user are maintained.

Whereas, in Layouts 3-1 and 3-2, some of the display units are non-smoothly connected at a predetermined angle, and a corner exists on the display surface. Therefore, for example, it is assumed that a video image is felt as being discontinuous at the corner portion of the display surface, and realistic feeling and immersion feeling of the user are impaired.

Note that, the Layouts 1 to 7 illustrate examples in which the display surface is curved or bent in a horizontal direction, but the display surface can also be curved or bent in a vertical direction.

3. Technical Problem of LED Display

Next, technical problems of the LED display will be described in comparison with a projector method.

First, geometric correction using a conventional projector method will be described.

Figure 4:
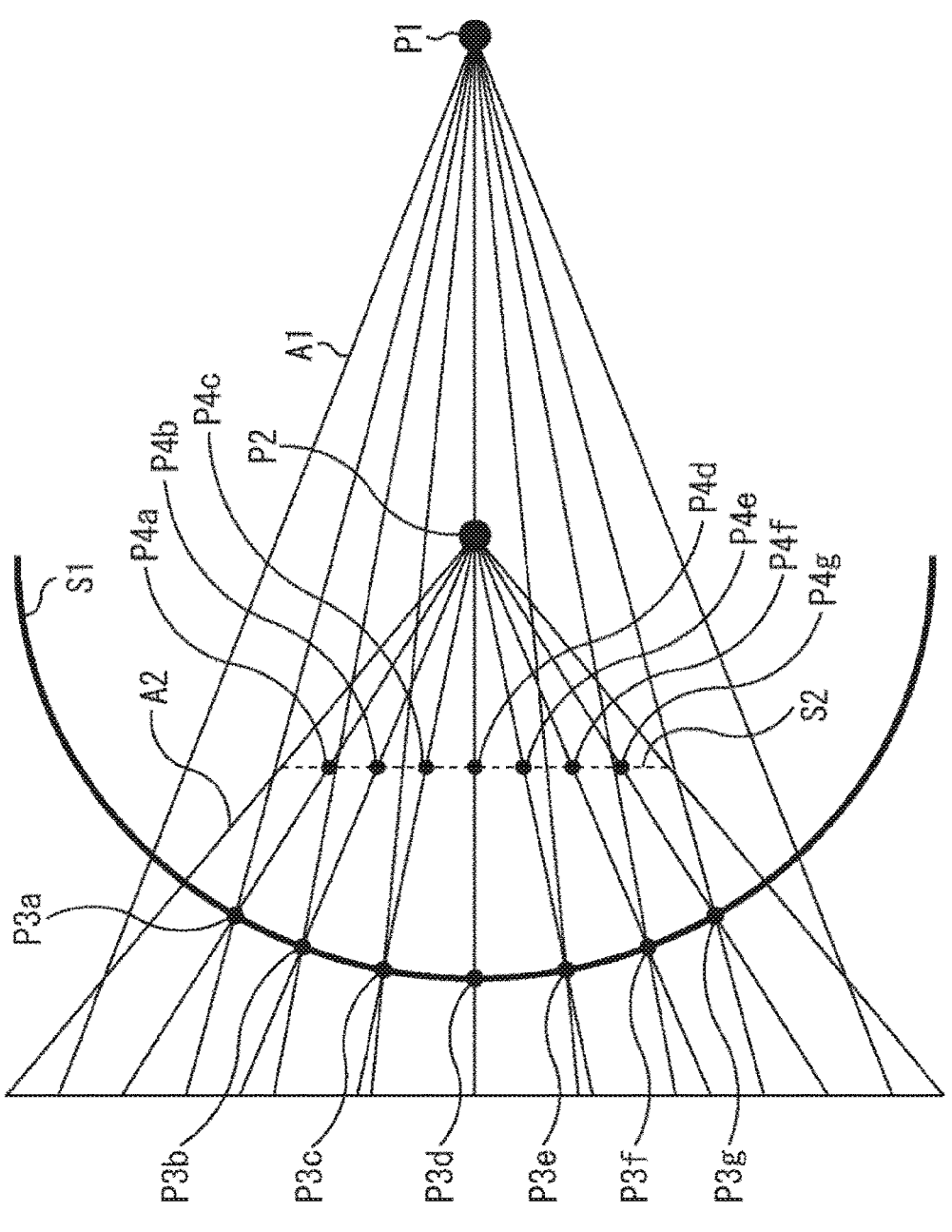
FIG. 4 is a view for explaining geometric correction in a projector method.

FIG. 4 illustrates an example of a system of a projector method that projects a video image on a dome-shaped screen S1 by a projector (not illustrated) (hereinafter, referred to as a projector P1) installed at an installation position P1.

In this example, a description is given to a method for allowing a user (hereinafter, referred to as a user P2) at a viewpoint position P2 to recognize an imaginary plane (hereinafter, referred to as a virtual plane) S2, and to view a video image without geometric distortion on the virtual plane S2.

An area A1 indicates a projection area of the projector P1. An area A2 indicates a field of view area of the user P2. Image formation points P3a to P3f indicate image formation points of light beams emitted from the projector P1, on the screen S1. Virtual pixels P4a to P4g indicate virtual pixels at intersection points between the virtual plane S2 and a straight line connecting the user P2 and the image formation points P3a to P3f (a line-of-sight of the user P2 with respect to the image formation points P3a to P3f).

Note that, hereinafter, an image formation point on the screen S1 and a virtual pixel on the virtual plane S2 on the same line-of-sight are referred to as a corresponding image formation point and virtual pixel. For example, the image formation point P3a and the virtual pixel P4a are an image formation point and a virtual pixel corresponding to each other.

Here, in a virtual pixel on a straight line connecting the viewpoint position P2 and the virtual plane S2, the user P2 can see an image at an image formation point, at an intersection point between the straight line and the screen S1. For example, the user P2 can individually see images at the image formation points P3a to P3g on the screen S1 in the virtual pixels P4a to P4g on the virtual plane S2. In other words, it appears to the user P2 that the images at the image formation points P3a to P3g are projected on the virtual pixels P4a to P4g respectively corresponding to the image formation points P3a to P3g.

On the other hand, when it is assumed that a video image without geometric distortion is displayed on the virtual plane S2, the video image projected from the projector P1 is geometrically corrected such that an image of each virtual pixel on the virtual plane S2 is projected at the corresponding image formation point on the screen S1. For example, the image projected from the projector P1 is geometrically corrected such that an image of the virtual pixel P4a when it is assumed that a video image without geometric distortion is displayed on the virtual plane S2 is projected onto the image formation point P3a of the screen S1. As a result, the user P2 recognizes that the video image without geometric distortion is displayed on the virtual plane S2.

Here, in order to geometrically correct the video image to allow the user P2 to recognize the video image without geometric distortion on the virtual plane S2, it is necessary to accurately recognize a positional relationship among the installation position P1, the viewpoint position P2, a projection point of the screen S1, and a virtual pixel of the virtual plane S2. For this purpose, a three-dimensional shape of the projection surface of the screen S1 needs to be accurately recognized and quantified.

Conventionally, for example, a structured light method is used to measure the shape of the projection surface of the screen S1. In the structured light method, structured light having a specific pattern is projected from the projector P1 onto the screen S1. Then, the shape of the projection surface of the screen S1 is measured on the basis of captured images obtained by capturing the screen S1 on which the structured light is projected, from a plurality of viewpoints. Furthermore, a position and an orientation of the projector P1 that projects the structured light are identified.

Figure 5:
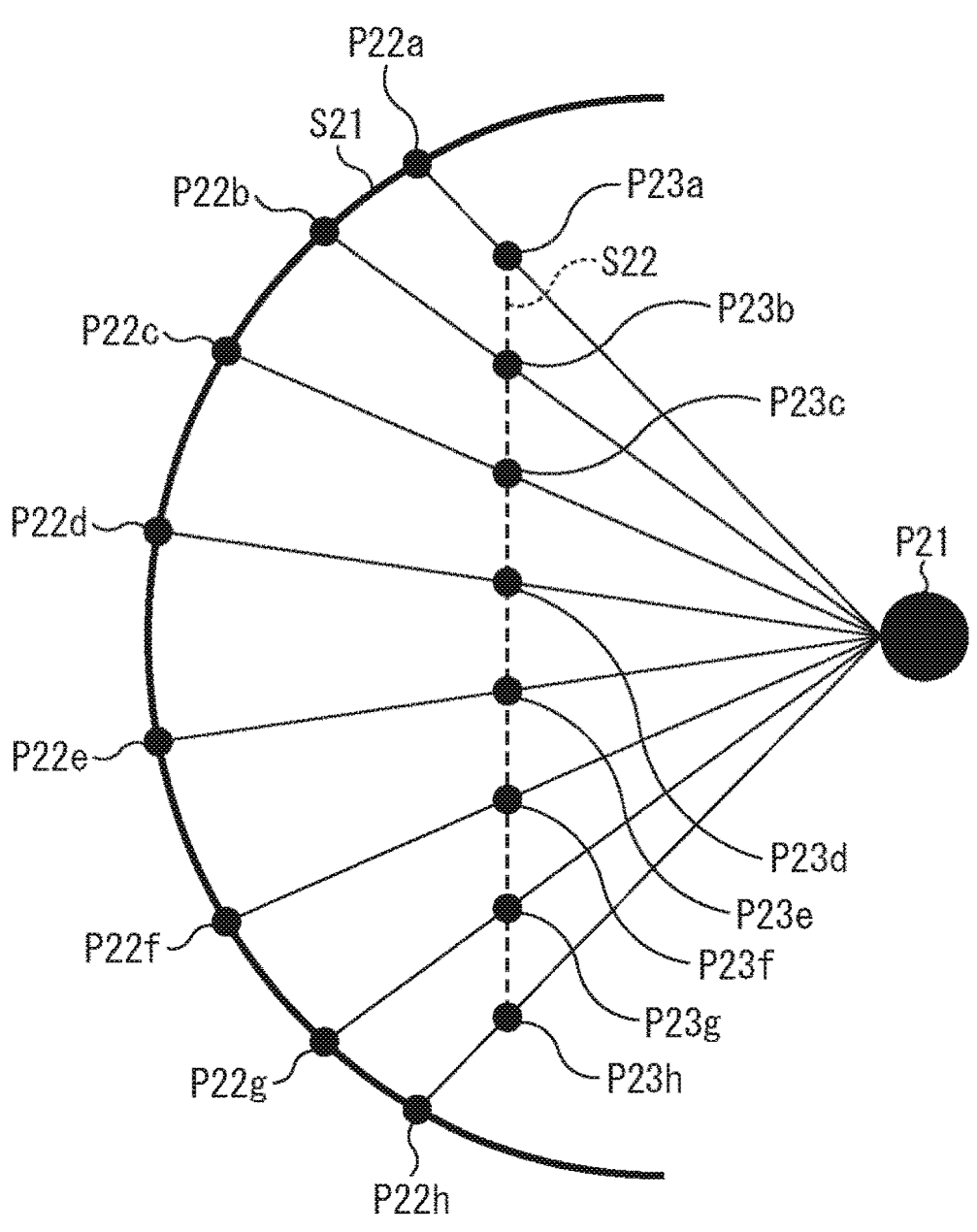
FIG. 5 is a view for explaining geometric correction in the LED display.

FIG. 5 illustrates an example of a relationship between a display surface S21 of the LED display and a viewpoint position P21 of the user.

In this example, a description is given to a method for allowing a user (hereinafter, referred to as a user P21) at the viewpoint position P21 to recognize a virtual plane S22, and to view a video image without geometric distortion on the virtual plane S22.

An area A21 indicates a field of view area of the user P21. Pixels P22a to P22h indicate pixels on the display surface S21 of the LED display. Virtual pixels P23a to P23h indicate virtual pixels at an intersection point between the virtual plane S22 and a straight line connecting the viewpoint position P21 and the pixels P22a to P22h (a line-of-sight of the user P21 with respect to the pixels P22a to P22h).

Note that, hereinafter, a pixel on the display surface S21 and a virtual pixel on the virtual plane S22 on the same line-of-sight are referred to as corresponding pixel and virtual pixel. For example, the pixel P22a and the virtual pixel P23a are a pixel and a virtual pixel corresponding to each other.

Here, in a virtual pixel on a straight line connecting the viewpoint position P21 and the virtual plane S22, the user P21 can see an image of a pixel at an intersection point between the straight line and the display surface S21. For example, the user P21 can individually see images of the pixels P22a to P22h on the display surface S21 in the virtual pixels P23a to P23h on the virtual plane S22. In other words, it appears to the user P21 that the images of the pixels P22a to P22h are projected on the virtual pixels P23a to P23h respectively corresponding to the pixels P22a to P22h.

On the other hand, when it is assumed that a video image without geometric distortion is displayed on the virtual plane S22, the video image displayed on the display surface S21 is geometrically corrected such that an image of each virtual pixel of the virtual plane S22 is displayed on a corresponding pixel of the display surface S21. For example, a video image displayed on the display surface S21 is geometrically corrected such that an image of the virtual pixel P23a when it is assumed that a video image without geometric distortion is displayed on the virtual plane S22 is displayed on the pixel P22a of the display surface S21. As a result, the user P21 recognizes that the video image without geometric distortion is displayed on the virtual plane S22.

Figure 6:
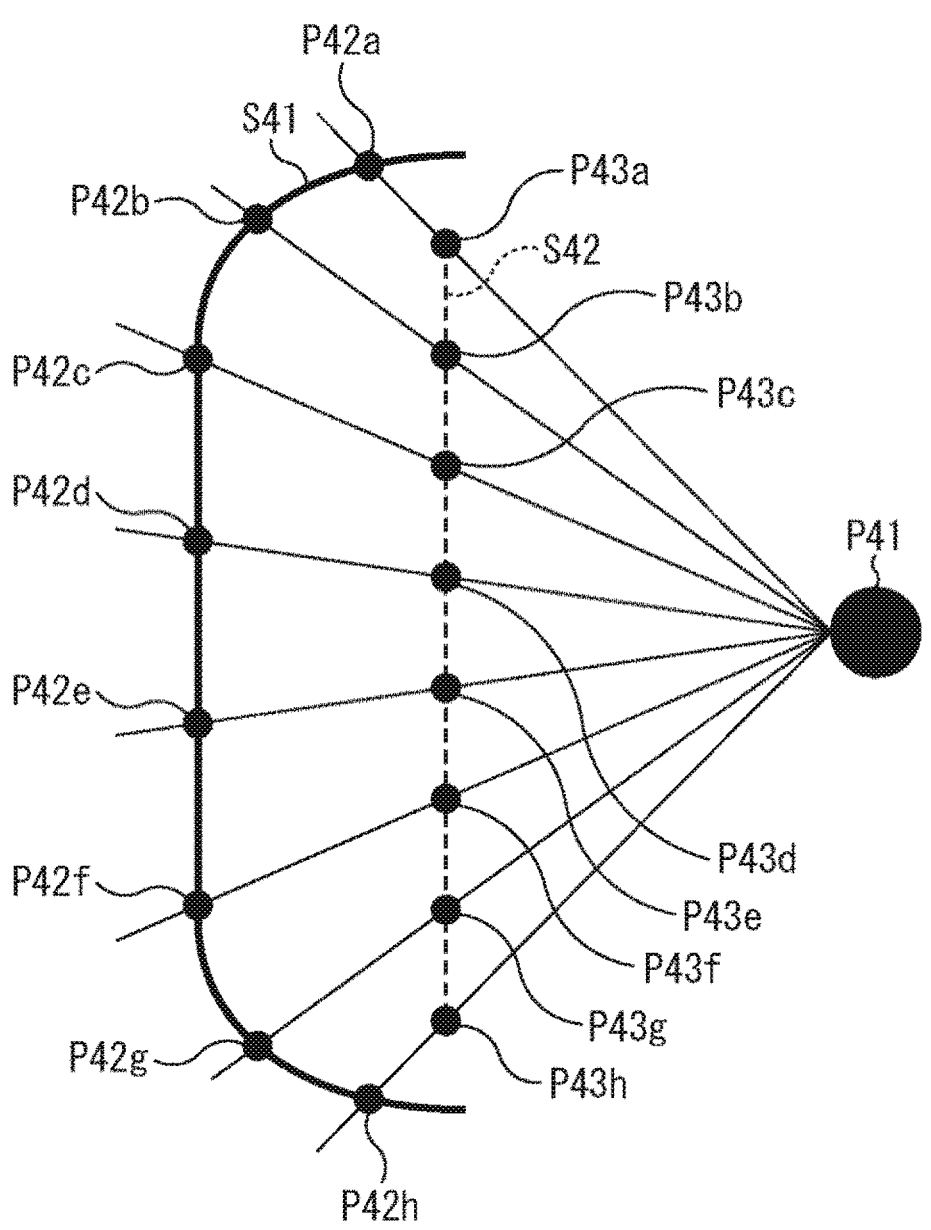
FIG. 6 is a view for explaining geometric correction in the LED display.

FIG. 6 illustrates an example of a relationship between a display surface S41 of the LED display and a viewpoint position P41 of the user.

Also in this example, by a method similar to that in FIG. 5, it is possible to allow a user (hereinafter, referred to as a user P41) at the viewpoint position P41 to recognize a virtual plane S42 and to view a video image without geometric distortion on the virtual plane S42.

An area A41 indicates a field of view area of the user P41. Pixels P42a to P42h indicate pixels on the display surface S41 of the LED display. Virtual pixels P43a to P43h indicate virtual pixels at an intersection point between the virtual plane S42 and a straight line connecting the user P41 and the pixels P42a to P42h (a line-of-sight of the user P42 with respect to the pixels P42a to P42h).

Then, similarly to the example of FIG. 5, when it is assumed that an image without geometric distortion is displayed on the virtual plane S42, the video image displayed on the display surface S41 is geometrically corrected such that an image of each virtual pixel of the virtual plane S42 is displayed on a corresponding pixel of the display surface S41. For example, a video image displayed on the display surface S41 is geometrically corrected such that an image of the virtual pixel P43a when it is assumed that a video image without geometric distortion is displayed on the virtual plane S42 is displayed on the pixel P42a of the display surface S41. As a result, the user P41 recognizes that the video image without geometric distortion is displayed on the virtual plane S42.

Here, in order to geometrically correct the video image to allow the user P21 to recognize the video image without geometric distortion on the virtual plane S22, it is necessary to accurately recognize a positional relationship among the viewpoint position P21, the pixel on the display surface S21, and the virtual pixel on the virtual plane S22. For this purpose, a shape and a pixel position of the display surface S21 need to be accurately recognized and quantified.

Similarly, in order to geometrically correct the video image to allow the user P41 to recognize the video image without geometric distortion on the virtual plane S42, it is necessary to accurately recognize a positional relationship among the viewpoint position P41, the pixel on the display surface S41, and the virtual pixel on the virtual plane S42. For this purpose, a shape and a pixel position of the display surface S41 need to be accurately recognized and quantified.

On the other hand, the structured light method described above can be adopted as the method for measuring the shape of the display surface of the LED display. Furthermore, a three-dimensional shape measurement method such as a stereo camera method, a ToF method, or a LiDAR method can be adopted.

Hereinafter, a sensor used in the three-dimensional shape measurement method such as a stereo camera method, a ToF method, or a LiDAR method is referred to as a depth sensor.

Furthermore, hereinafter, the measurement method using the depth sensor is referred to as a depth sensor method.

When the structured light method and the depth sensor method are applied to measurement of the shape of the display surface of the LED display, the following problems occur.

For example, there is a problem that it is difficult to measure, and a load increases. For example, some LED displays include a large display surface of 200 inches or more. Whereas, a general depth sensor has a small angle of view that can be measured at one time, and a short measurement distance. For this reason, when the depth sensor method is adopted to measure the three-dimensional shape of the large display surface, it is difficult to grasp the shape of the display surface by one measurement. Therefore, for example, in order to accurately measure a display surface having an angle inside such as a dome shape or a cylindrical shape, various measures such as using a plurality of depth sensors are required. Therefore, it takes a lot of time and effort to obtain sufficient measurement accuracy.

Furthermore, measurement accuracy is a problem. For example, the depth sensor of the LiDAR method has a low measurement density in a vertical direction. Therefore, it is difficult for measurement accuracy of the depth sensor of the LiDAR method to satisfy accuracy required for measuring the three-dimensional shape of the display surface of the LED display. Here, the accuracy required for measuring the three-dimensional shape of the display surface of the LED display is defined by, for example, a pixel pitch of the display surface of the LED display. Note that, similarly, depth sensors of other methods do not have sufficient measurement accuracy for the pixel pitch of the LED display.

Therefore, even if the three-dimensional shape of the display surface of the LED display can be measured, conventional depth sensors cannot obtain measurement accuracy required for associating each pixel position with the measured display surface. Therefore, it is difficult to accurately perform geometric correction on a video image.

Moreover, facility cost is a problem. For example, in the structured light method, a plurality of projectors and a plurality of cameras are required to project and recognize structured light. Therefore, time and effort and cost for installing these facilities are required.

The present technology makes it possible to solve these problems.

4. Embodiment

Next, an embodiment of the present technology will be described with reference to FIGS. 7, 8, 9, 10, 11, 12, 13, 14, 15, 16A, 16B, 17, 18A, 18B, 19, 20A, 20B, 20C, 20D, 20E, 20F, 21, 22, 23, 24, 25A, 25B, 26, and 27.

<Configuration Example of Video Processing System 101>

Figure 7:
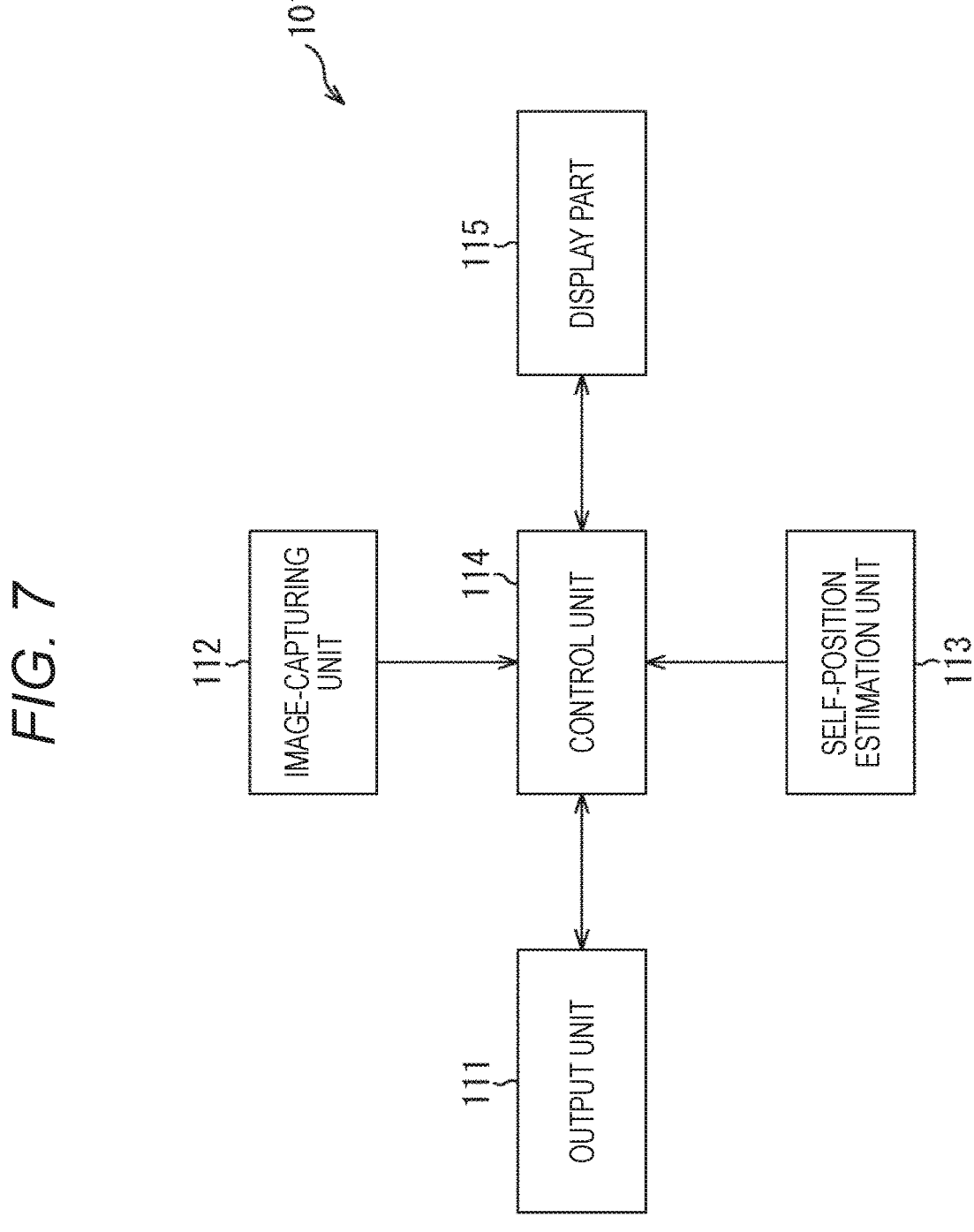
FIG. 7 is a block diagram illustrating an embodiment of a video processing system to which the present technology is applied.

FIG. 7 illustrates a configuration example of a video processing system 101 to which the present technology is applied.

The video processing system 101 includes an output unit 111, an image-capturing unit 112, a self-position estimation unit 113, a control unit 114, and a display part 115. The output unit 111, the image-capturing unit 112, and the display part 115 are connected to the control unit 114 in a wired or wireless manner.

The output unit 111 includes, for example, a video server or the like. The output unit 111 accumulates video data, and transmits a video signal (hereinafter, referred to as an input video signal) including a requested video image (hereinafter, referred to as an input video image) to the control unit 114 in response to a request from the control unit 114.

The image-capturing unit 112 includes, for example, a visible light camera or an infrared light (IR) camera. The image-capturing unit 112 captures an image of the user, and transmits, to the control unit 114, a video signal (hereinafter, referred to as a captured video image signal) including a video image (hereinafter, referred to as a captured video image) obtained as a result of image-capturing.

The self-position estimation unit 113 includes, for example, a mobile device worn or held by the user. Specifically, for example, the self-position estimation unit 113 includes a wearable device worn on a head part, a wrist, an ankle, waist, or the like of the user, or a handheld device such as a smartphone. The self-position estimation unit 113 estimates a self-position of the user (that is, a position and an orientation of the user) by any technique, and transmits a signal (hereinafter, referred to as a self-position estimation signal) including an estimation result to the control unit 114.

The control unit 114 includes, for example, a display controller 151 (FIG. 8), a PC (not illustrated), and the like. The control unit 114 receives metadata including parameters related to attributes and positions of the individual display units 201 constituting the display part 115, from the individual display units 201. The control unit 114 performs geometric correction on the input video image on the basis of the captured video image or the estimation result of the self-position of the user, the metadata of each display unit 201, and the like, and generates an output video image. The control unit 114 transmits a video signal (hereinafter, referred to as an output video signal) including the output video image to the display part 115, and controls display of the output video image by the display part 115.

The display part 115 includes, for example, an LED display in which multiple display units 201 (FIG. 10) are combined. The display part 115 displays the output video image on the basis of the output video signal.

Note that the output unit 111 may be provided integrally with the display controller 151 included in the control unit 114, for example.

<Configuration Example of Display Controller 151>

Figure 8:
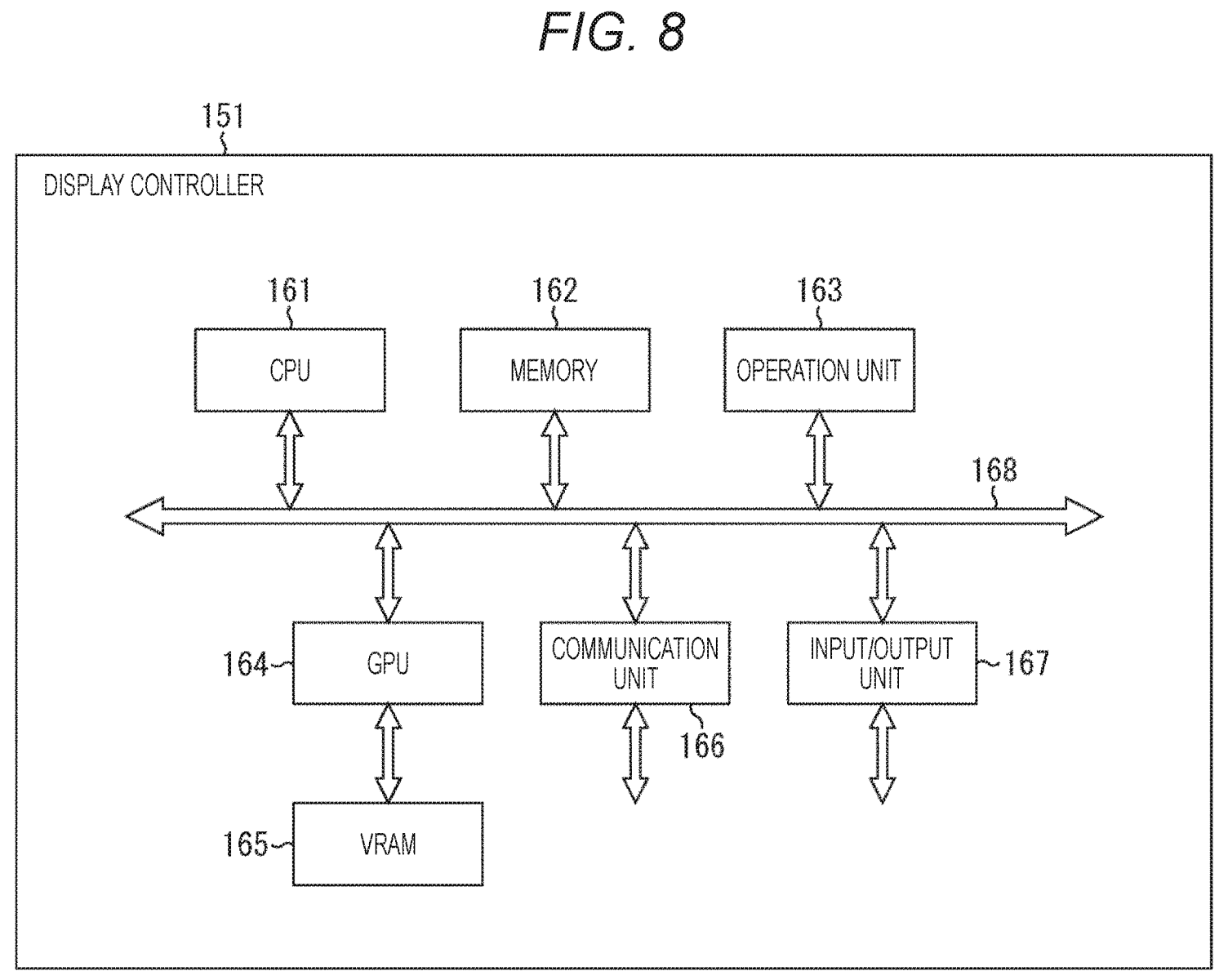

FIG. 8 illustrates a hardware configuration example of the display controller 151 constituting the control unit 114 in FIG. 7.

Figure 10:
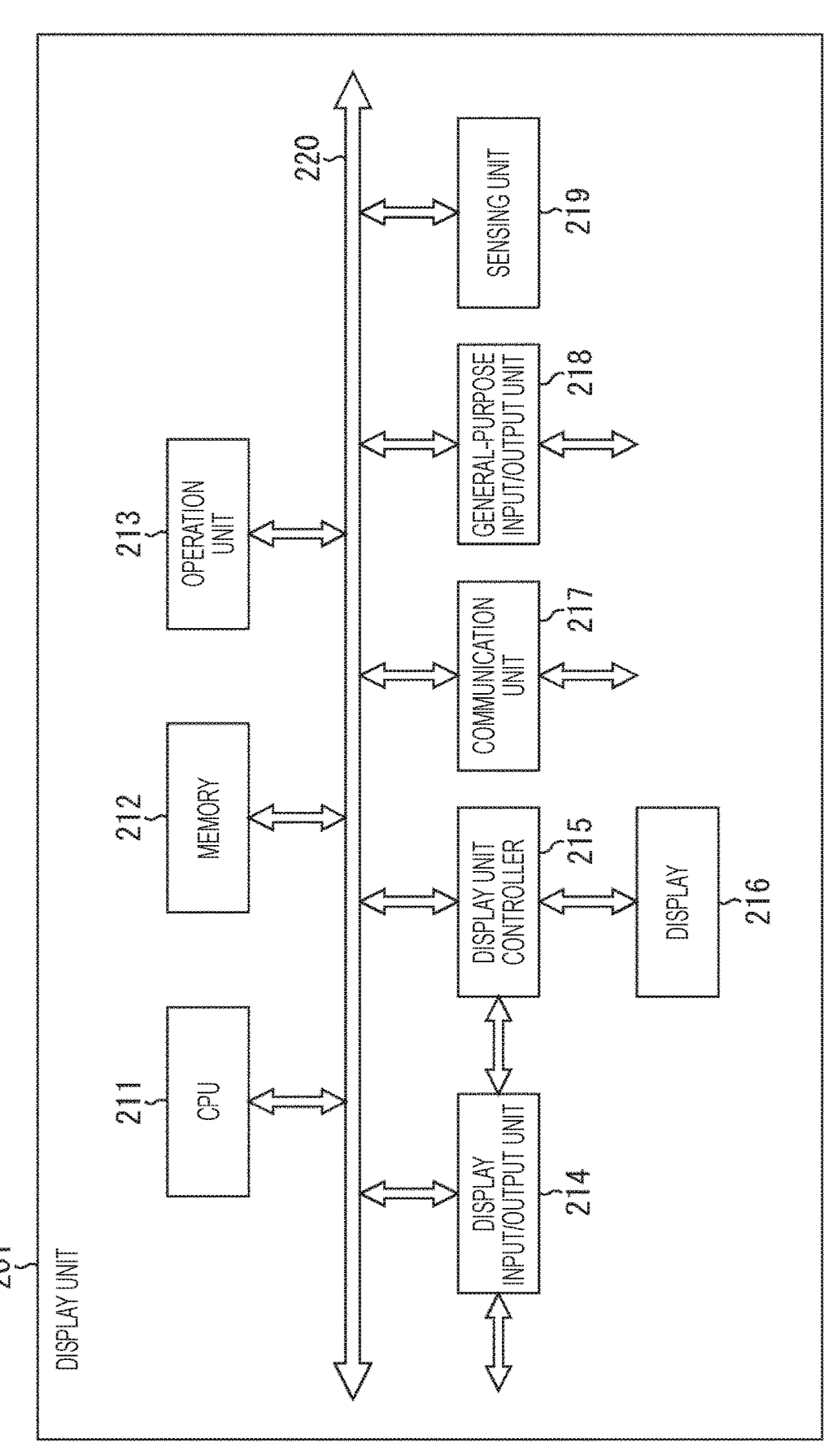
FIG. 10 is a block diagram illustrating an embodiment of a display unit to which the present technology is applied.

The display controller 151 performs display control of the display part 115 by integrally controlling the individual display units 201 (FIG. 10). The display controller 151 includes a central processing unit (CPU) 161, a memory 162, an operation unit 163, a graphics processing unit (GPU) 163, a video RAM (VRAM) 165, a communication unit 166, and an input/output unit 167. The CPU 161, the memory 162, the GPU 164, the communication unit 166, and the input/output unit 167 are mutually connected via a bus 168.

The CPU 161 controls the entire display controller 151 and performs various types of processing.

The memory 162 includes, for example, a RAM and a ROM. The memory 162 stores programs, data, and the like necessary for processing of the display controller 151.

The operation unit 163 includes, for example, an operation device such as a switch, a button, or a key. The operation unit 163 outputs an operation signal indicating an operation content of the provider or the like to the bus 168.

The GPU 164 executes various types of processing on an input video image. For example, the GPU 164 performs geometric correction on the input video image and generates an output video image. For example, the GPU 164 divides the output video image for every area corresponding to the individual display units 201, and generates output video signals each including the divided output video image.

The VRAM 165 is connected to the GPU 164. The VRAM 165 stores data (for example, input video images and output video images) necessary for processing of the GPU 164.

The communication unit 166 includes, for example, a network interface card (NIC), a communication device that performs wireless communication conforming to Wi-Fi, and the like.

The input/output unit 167 includes, for example, a general purpose input/output (GPIO) or the like.

The communication unit 166 and the input/output unit 167 communicate with an external device or the like including the output unit 111, the image-capturing unit 112, the self-position estimation unit 113, and the display part 115, in a wired or wireless manner.

<Configuration Example of Information Processing Unit 171>

Figure 9:
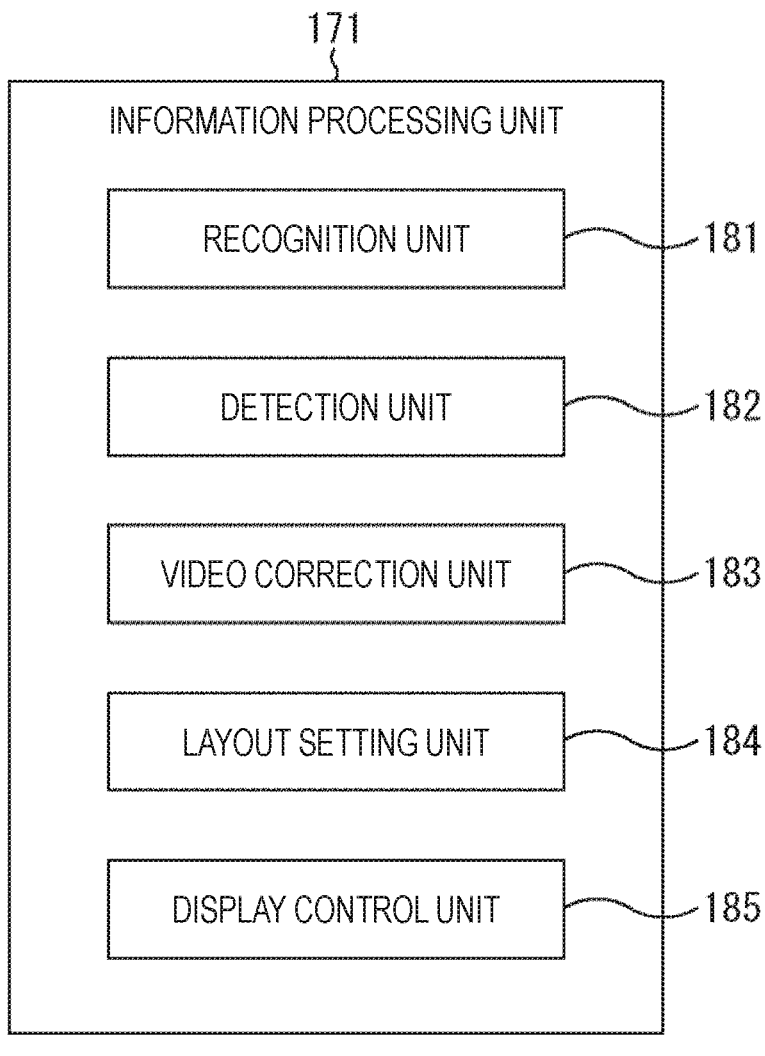
FIG. 9 is a block diagram illustrating a functional configuration example of an information processing unit implemented by the display controller.

FIG. 9 illustrates a functional configuration example of an information processing unit 171 implemented when the CPU 161 and the GPU 164 of the display controller 151 execute a predetermined control program, for example.

The information processing unit 171 includes a recognition unit 181, a detection unit 182, a video correction unit 183, a layout setting unit 184, and a display control unit 185.

As will be described later, the recognition unit 181 performs recognition processing on a shape, a pixel position, and the like of the display surface of the display part 115 on the basis of metadata and the like received from each display unit 201.

The detection unit 182 performs detection processing on a field of view or a viewpoint of the user, on the basis of a captured video image captured by the image-capturing unit 112 or a self-position of the user estimated by the self-position estimation unit 113.

As will be described later, the video correction unit 183 performs geometric correction on an input video image on the basis of the shape and the pixel position of the display surface of the display part 115, and the field of view, the viewpoint, and the like of the user, and generates an output video image.

The layout setting unit 184 sets a display layout of the output video image as described later. Specifically, for example, in a case of causing the display part 115 to simultaneously display output video images of multiple channels, the layout setting unit 184 sets a layout for displaying the output video image of each channel on the display surface of the display part 115, on the basis of the shape and the like of the display surface of the display part 115.

The display control unit 185 controls display of the output video image by the display part 115. Specifically, for example, the display control unit 185 divides the output video image for every area corresponding to each display unit 201, and generates output video signals each including the divided output video image. Furthermore, the display control unit 185 transmits each output video signal to the corresponding display unit 201 via the communication unit 166 or the input/output unit 167.

<Configuration Example of Display Unit 201>

FIG. 10 illustrates a hardware configuration example of the display unit 201 constituting the display part 115.

The display unit 201 includes a CPU 211, a memory 212, an operation unit 213, a display input/output unit 214, a display unit controller 215, a display 216, a communication unit 217, a general-purpose input/output unit 218, and a sensing unit 219. The CPU 211, the memory 212, the operation unit 213, the display input/output unit 214, the display unit controller 215, the communication unit 217, the general-purpose input/output unit 218, and the sensing unit 219 are connected to one another via a bus 220.

The CPU 211 controls the entire display controller 151 and performs various types of processing.

Note that, the CPU 211 may be integrated into the CPU 161 of the display controller 151, for example.

The memory 212 includes, for example, a ROM and a RAM. The memory 212 stores programs, data, and the like necessary for processing of the display unit 201. Furthermore, the memory 212 stores metadata of the display unit 201 to be described later.

The display input/output unit 214 is an interface (connection unit) that electrically connects between with the display controller 151 and between with another display unit 201. For example, another display unit 201 is connected using an interface such as a high-definition multimedia interface (HDMI, registered trademark), a display port, or a local area network (LAN). The display input/output unit 214 is provided, for example, in a peripheral portion of the display unit 201.

The display unit controller 215 performs display control of a video image by the display 216, in cooperation with the CPU 211.

In the display 216, for example, multiple pixels including red (R), green (G), and blue (B) LEDs are placed side by side, and a video image is displayed under the control of the display unit controller 215.

The communication unit 217 includes, for example, an NIC, a communication device or the like that performs wireless communication conforming to Wi-Fi, and the like.

The general-purpose input/output unit 218 includes, for example, GPIO or the like.

The communication unit 217 and the general-purpose input/output unit 218 communicate with an external device other than the display controller 151 and another display unit 201.

The sensing unit 219 includes various sensors. For example, the sensing unit 219 includes a sensor or the like to be used for detecting a position and an orientation of the display unit 201. Specifically, for example, the sensing unit 219 includes a sensor to be used for detecting a connection relationship between with an adjacent display unit 201, such as an RFID tag and a reader, or a diode. For example, the sensing unit 219 includes a gyro sensor, an acceleration sensor, and a geomagnetic sensor, and includes an inertial measurement unit (IMU) to be used for detecting a position and an orientation of the display unit 201. The sensing unit 219 outputs a signal (hereinafter, referred to as a sensor signal) output from each sensor, to the bus 220.

<Configuration Example of Information Processing Unit 231>

Figure 11:
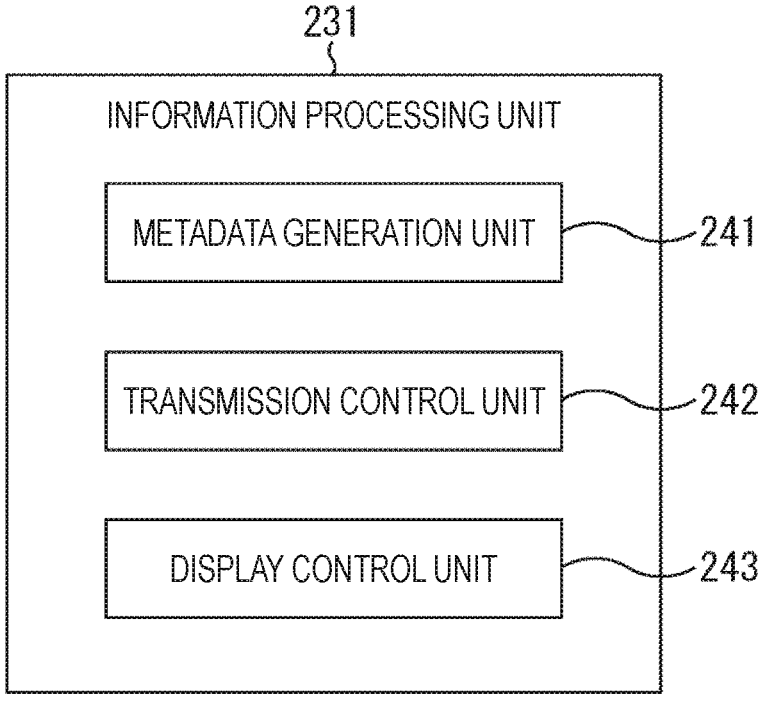
FIG. 11 is a block diagram illustrating a functional configuration example of an information processing unit implemented by the display unit.

FIG. 11 illustrates a functional configuration example of an information processing unit 231 implemented when the CPU 211 and the display unit controller 215 of the display unit 201 execute a predetermined control program, for example.

The information processing unit 231 includes a metadata generation unit 241, a transmission control unit 242, and a display control unit 243.

As described later, the metadata generation unit 241 generates a part of metadata of the display unit 201, and causes the generated metadata to be stored in the memory 212.

The transmission control unit 242 controls transmission of metadata to the display controller 151. For example, the transmission control unit 242 reads metadata from the memory 212 in response to a request from the display controller 151, and transmits a metadata signal including the read metadata to the display controller 151 via the display input/output unit 214.

The display control unit 243 performs display control on the display 216. For example, the display control unit 243 causes the display 216 to display an output video image based on an output video signal received from the display controller 151.

<Parameter Table>

FIG. 12 illustrates an example of a parameter table managed by each display unit 201. The parameter table is a list of parameters included in the metadata of the display unit 201, and is stored in the memory 212 of each display unit 201, for example.

The parameter table includes parameters of an UID, a shape, a position X, a position Y, a curvature radius X, a curvature radius Y, a pixel pitch, side lengths 1 to n, and connection angles 1 to n. Among these parameters, the shape, the curvature radius X, the curvature radius Y, the pixel pitch, and the side lengths 1 to n are parameters related to attributes of the display unit 201 (more specifically, the display 216). The position X, the position Y, and the connection angles 1 to n are parameters related to a position of the display unit 201 (more specifically, the display 216).

The UID is an ID (identification information) assigned to identify each display unit 201 constituting the display part 115.

The shape indicates a shape of the display unit 201 (more specifically, the display 216).

The position X and the position Y indicate a position of the display unit 201 (more specifically, the display 216) in the display part 115, in other words, a relative position between individual display parts and 201. For example, the position X and the position Y respectively indicate positions of each display unit 201 in an X direction and a Y direction in a coordinate system of a developed view in which the display surface of the display part 115 is developed in a two-dimensional plane.

Figure 13:
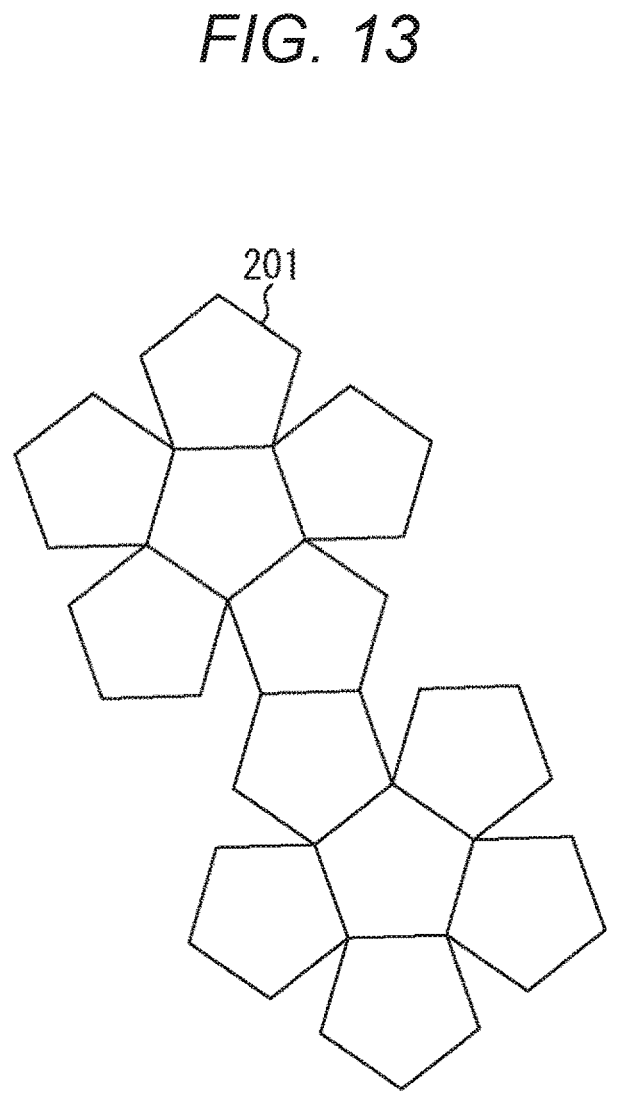

For example, FIG. 13 illustrates an example of a developed view of the display surface of the display part 115. In this example, the display surface of the display part 115 has a shape in which pentagonal display units 201 are arranged in a spherical shape. Then, the position X and the position Y of each display unit 201 are set in the coordinate system of the developed view of the display surface of the display part 115.

Note that, for example, a dedicated display unit 201 may be arranged as an origin of the coordinate system of the developed view. Alternatively, for example, the provider may designate any display unit 201 as the origin of the coordinate system of the developed view at the time of installation or the like of the display part 115.

The curvature radius X and the curvature radius Y indicate curvature radii (the unit is mm) in an X direction and a Y direction of the display unit 201 (more specifically, the display 216). The X direction and the Y direction are directions orthogonal to each other. For example, the X direction indicates a lateral direction when the display unit 201 is normally installed. For example, the Y direction indicates a vertical direction when the display unit 201 is normally installed.

Note that, when the display surface of the display 216 is not curved in the X direction, that is, when the curvature radius in the X direction is infinite, a value of the curvature radius X is not to be set. Similarly, when the display surface of the display 216 is not curved in the Y direction, that is, when the curvature radius in the Y direction is infinite, a value of the curvature radius Y is not to be set.

Furthermore, instead of the curvature radius, a curvature may be used.

The pixel pitch indicates a pitch (the unit is mm) between adjacent pixels of the display unit 201 (more specifically, the display 216).

The side lengths 1 to n are metadata indicating a size of the display unit 201 (more specifically, the display 216). When the display unit 201 (more specifically, the display 216) has an n-sided polygonal shape, the side lengths 1 to n indicate a length (unit is mm) of each side (sides 1 to n).

Note that a resolution (the number of pixels) of the display unit 201 (more specifically, the display 216) is calculated from the pixel pitch and the side lengths 1 to n.

The connection angles 1 to n indicate an angle (the unit is degree) between with another display unit 201 (more specifically, the display 216 of another display unit 201) individually connected to each of the sides 1 to n of the display unit 201 (more specifically, the display 216).

For example, when another display unit 201 (hereinafter, referred to as an adjacent unit) is connected to a side i of the display unit 201 and both units are not smoothly connected to each other, that is, when a non-smooth surface is formed between both units, an angle between both units is set to a connection angle i. A shape of a corner of the display surface of the display part 115 is recognized with the connection angles 1 to n.

Whereas, when both units are smoothly connected, that is, when a smooth surface is formed between both units, a value of the connection angle i is not to be set.

Note that, for example, when at least one of both units is curved in an adjacent direction, a value of the connection angle is not to be set. For example, when the display unit 201 and another display unit 201 are adjacent in a horizontal direction and at least one of them is curved in the horizontal direction, a value of the connection angle between both units is not to be set.

Furthermore, when another display unit 201 is not connected to the side i of the display unit 201, a value of the connection angle i is not to be set.

<Setting Method for Parameters>

Next, an example of a setting method for each parameter in the parameter table of FIG. 12 will be described.

The shape, the curvature radius X, the curvature radius Y, the pixel pitch, and the side lengths 1 to n are parameters related to attributes of the display unit 201, and are known at the time of manufacturing. Therefore, these parameters are stored in the memory 212 as metadata unique to each display unit 201, at the time of manufacturing, factory shipment, or the like.

Whereas, the UID, the position X, the position Y, and the connection angles 1 to n are unknown parameters at the time of manufacturing of the display unit 201. These parameters are set automatically or manually, for example, when each display unit 201 is connected and the display part 115 is installed, and are stored in the memory 212.

Here, an example of a setting method for the UID, the position X, the position Y, and the connection angles 1 to n will be described.

<Setting Method for UID>

For example, the metadata generation unit 241 of each display unit 201 sets an UID of the own unit in cooperation with the metadata generation unit 241 of another display unit 201.

Specifically, for example, when the display part 115 is installed, the metadata generation unit 241 of each display unit 201 recognizes an order of connection, and automatically and continuously sets the UID in accordance with the order of connection.

Alternatively, for example, the provider selects any display unit 201 as a display unit 201 serving as a reference. Then, the metadata generation unit 241 of each display unit 201 automatically and continuously sets the UID with reference to the selected display unit 201.

For example, when the display unit 201 is arranged in a tiling manner, the metadata generation unit 241 of the display unit 201 serving as a reference gives a notification of the UID of the own unit to the metadata generation unit 241 of the display unit 201 adjacent in a predetermined direction (for example, a clockwise direction as viewed from a light emitting surface side). The metadata generation unit 241 of the adjacent display unit 201 increments the UID of the notification by one, and sets as the UID of the own unit. Then, the metadata generation unit 241 further gives a notification of the set UID to the metadata generation unit 241 of the display units 201 adjacent in the same direction. By repeating this processing, the UIDs of the display units 201 adjacent in a predetermined direction are set. When all the UIDs of the display units 201 adjacent in the predetermined direction are set, the UIDs of the display units 201 in a row immediately above or below are set by a similar method. By repeating this processing, a unique UID is set for all the display units 201.

Note that, for example, the display controller 151 may perform some or all of the setting processing for the UID for each display unit 201.

Furthermore, for example, the provider may set the UID of each display unit 201 by using the operation unit 213 or the like.

<Setting Method for Position X and Position Y>

Figure 14:
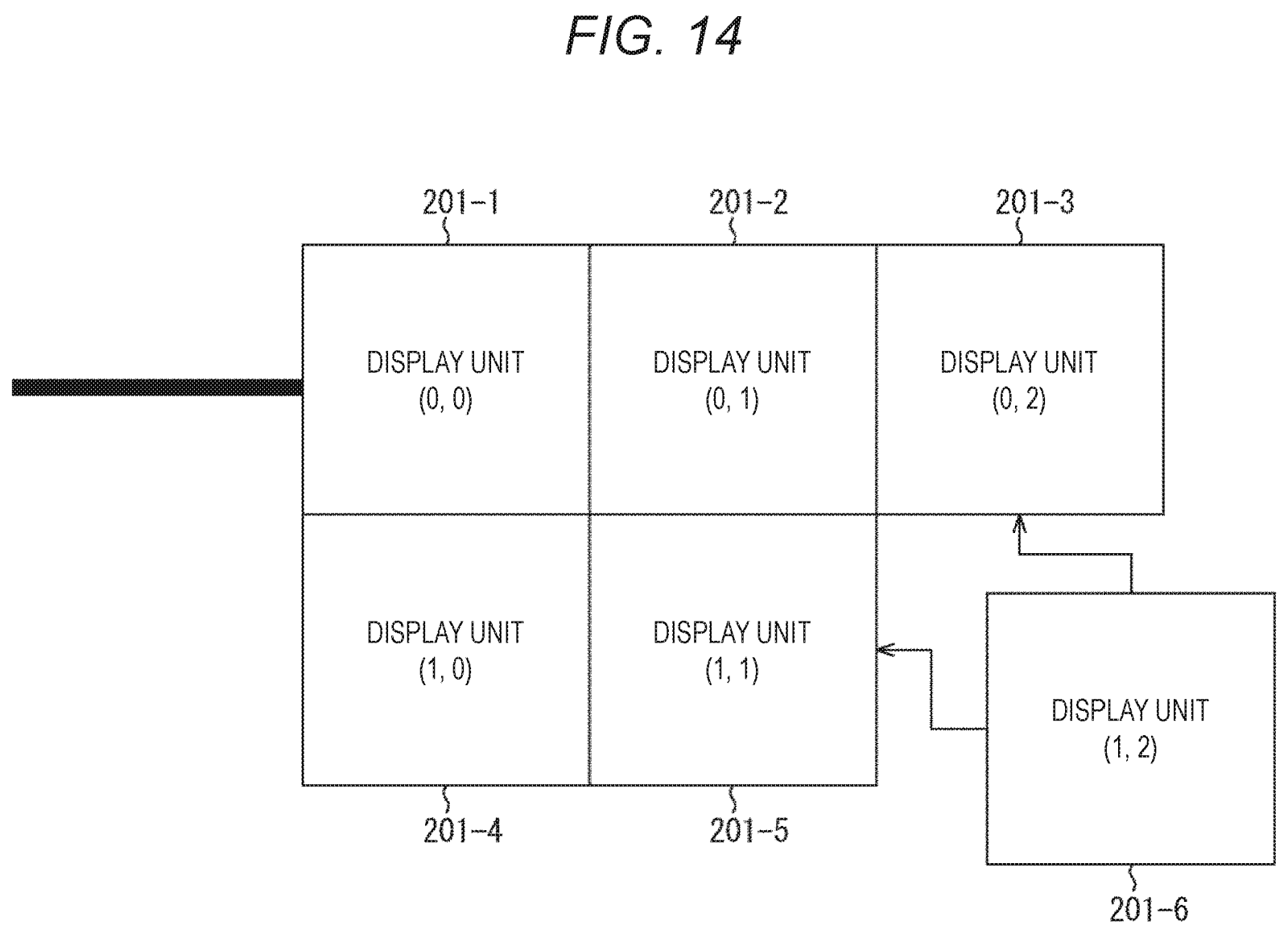

FIG. 14 illustrates an example of a setting method for the position X and the position Y. In this example, display units 201-1 to 201-6 are arranged in two vertical rows x three horizontal columns.

For example, (Position X, Position Y) of the display unit 201-1 at an upper left corner is set to (0, 0). (Position X, Position Y) of the display unit 201-2 on the right of the display unit 201-1 is set to (0, 1). (Position X, Position Y) of the display unit 201-3 on the right of the display unit 201-2 is set to (0, 2). (Position X, Position Y) of the display unit 201-4 below the display unit 201-1 is set to (1, 0). (Position X, Position Y) of the display unit 201-5 on the right of the display unit 201-4 is set to (1, 1). (Position X, Position Y) of the display unit 201-6 on the right of the display unit 201-5 is set to (1, 2).

For example, the metadata generation unit 241 of each display unit 201 sets the position X and the position Y of the own unit in cooperation with the metadata generation unit 241 of another display unit 201, similarly to the case of setting the UID.

Note that, for example, the display controller 151 may perform some or all of the setting processing for the position X and the position Y of each display unit 201.

Furthermore, for example, the provider may set the position X and the position Y of each display unit 201 by using the operation unit 213 or the like.

<Setting Method for Connection Angles 1 to n>

For example, the metadata generation unit 241 of each display unit 201 detects an installation direction of the own unit on the basis of sensor data from the IMU included in the sensing unit 219. For example, on the basis of sensor data from an acceleration sensor and a geomagnetic sensor included in the IMU, the metadata generation unit 241 detects an installation direction in an X-axis direction, a Y-axis direction, and a Z-axis direction in a three-dimensional coordinate system of the own unit.

Next, the metadata generation unit 241 communicates with the display unit 201 adjacent to each side of the own unit, and acquires a detection result of the installation direction of the display unit 201 adjacent to each side. Then, the metadata generation unit 241 detects a connection angle between with the display unit 201 adjacent to each side, on the basis of the installation direction of the own unit and the installation direction of the display unit 201 adjacent to each side. Then, the metadata generation unit 241 sets the detected connection angle to the connection angles 1 to n.

Note that, for example, the display controller 151 may perform some or all of the setting processing for the connection angles 1 to n of each display unit 201.

Furthermore, for example, the provider may set the connection angles 1 to n of each display unit 201.

Figure 15:
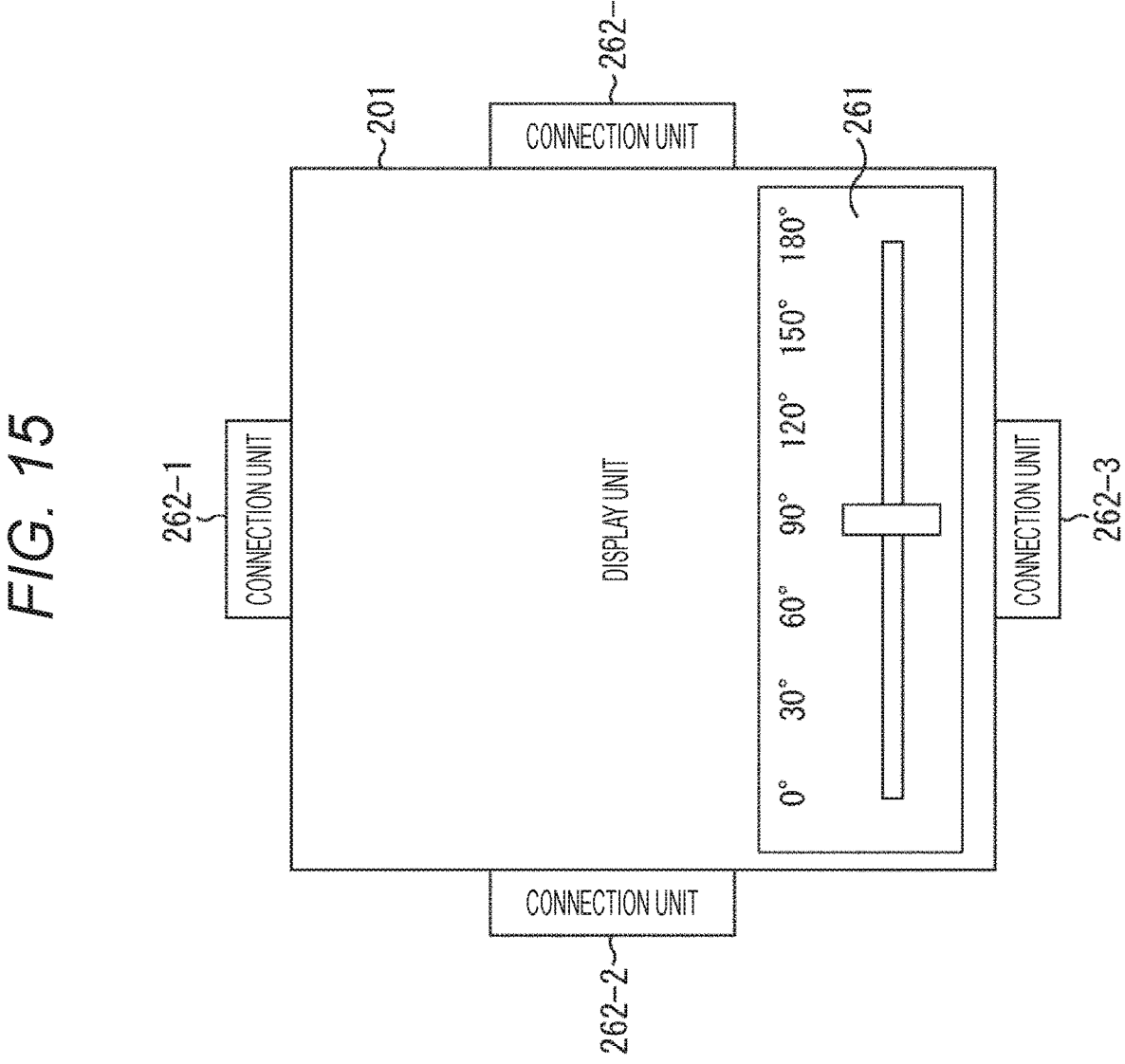
FIG. 15 is a view illustrating an example of a switch member to be used for setting connection angles 1 to n.

FIG. 15 illustrates an example of a switch member to be used for setting the connection angles 1 to n.

Specifically, in the example of FIG. 15, a slide bar switch 261 is provided as a switch member on a back surface of the display unit 201. The slide bar switch 261 can change a value of the connection angle by sliding the bar.

The slide bar switch 261 is electrically connected to, for example, the general-purpose input/output unit 218 of the display unit 201, and transmits a signal indicating angle information according to an operation of the provider, to the metadata generation unit 241. The metadata generation unit 241 sets an angle set by the slide bar switch 261 to the connection angles 1 to n, and causes the connection angles 1 to n to be stored in the memory 212.

For example, connection units 262-1 to 262-4 that are physically driven in conjunction with a set value of the slide bar switch 261 may be provided on each side of the display unit 201. For example, the connection units 262-1 to 262-4 are automatically driven so as to obtain a connection angle set by the slide bar switch 261. Note that the connection angles of the connection units 262-1 to 262-4 can be individually set.

Note that a switch member other than the slide bar switch 261 can be used as long as the switch member can be operated stepwise or continuously and can output a signal indicating angle information.

Furthermore, for example, the display unit 201 including the switch member may be used only for the display unit 201 constituting a non-smooth surface.

<Specific Example of Parameter Table>

Next, a specific example of a parameter table will be described with reference to FIGS. 16A, 16B, 17, 18A, 18B, 19, 20A, 20B, 20C, 20D, 20E, 20F, [to] and 21.

Figure 16:
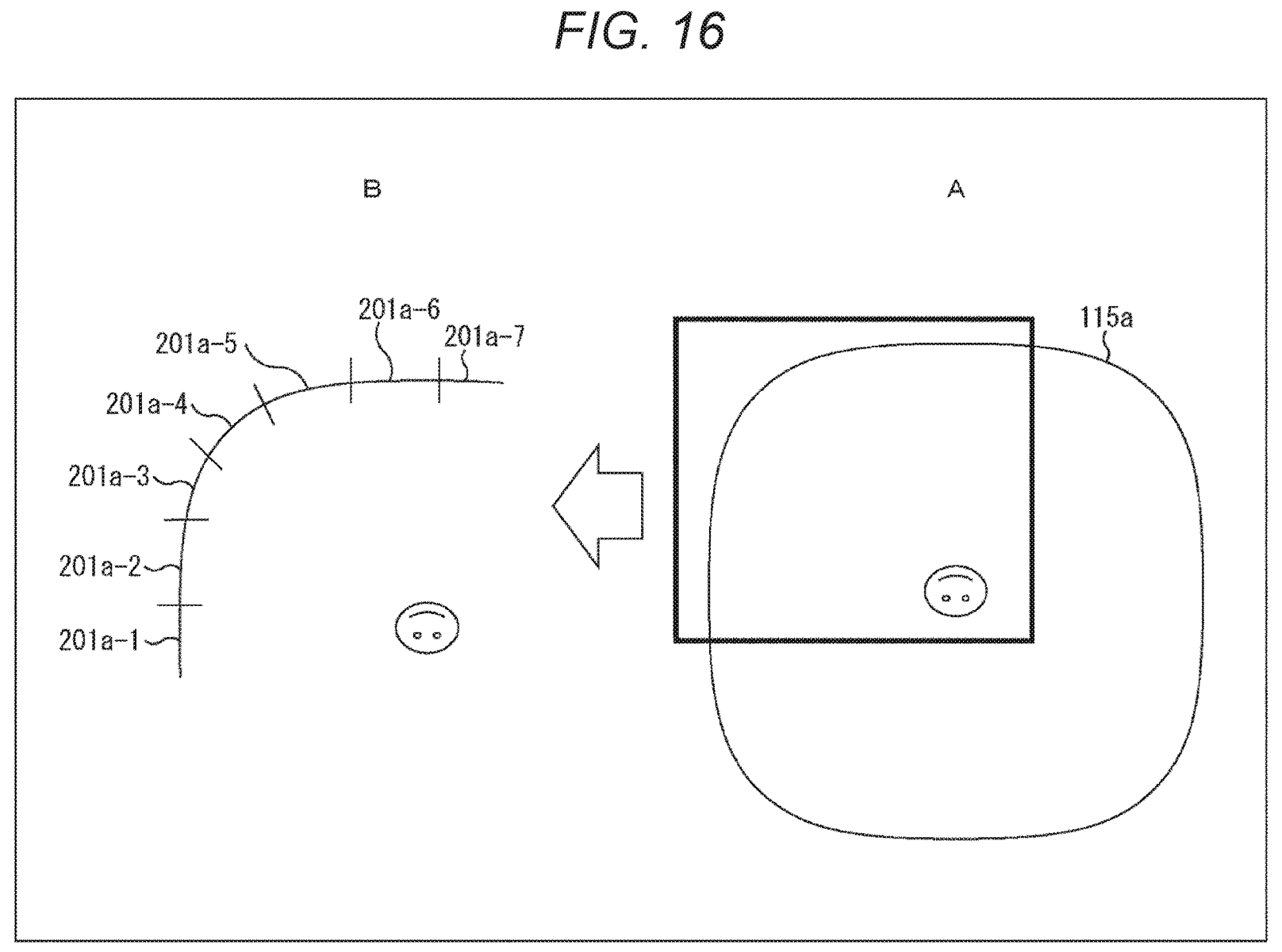

FIGS. 16A and 16B schematically illustrates a configuration example of a display part 115a which is one embodiment of the display part 115. FIG. 16A is a schematic view of the display part 115 as viewed from above, and FIG. 16B is an enlarged view of a portion surrounded by a square in FIG. 16A.

The display part 115b is installed so as to surround around the user when viewed from above. Furthermore, the display part 115b has a substantially square shape that is rounded as a whole when viewed from above. The display part 115b includes two types of display units 201a having different curvatures in the horizontal direction.

Specifically, a curvature in the horizontal direction of the display part 115a near four corners of the display unit 201a is different from a curvature in the horizontal direction of another display units 201a. For example, among display units 201a-1 to 201a-7 illustrated in FIG. 16B, curvatures in the horizontal direction of the display units 201a-1, 201a-2, 201a-6 and 201a-7 are different from curvatures of the display units 201a-3 to 201a-5.

FIG. 17 illustrates a specific example of a parameter table of the display units 201a-1 to 201a-4 among the display units 201a-1 to 201a-7 illustrated in FIG. 16B.

Since the shapes, the pixel pitches, and the side lengths 1 to 4 of the individual display units 201b each are the same, the same values are individually set.

Note that the side length 1, the side length 2, the side length 3, and the side length 4 indicate lengths of an upper side, a right side, a lower side, and a left side of the display unit 201a, respectively. Note that the right side of the display unit 201a is a right side in a case of facing a direction in which a video image of the display unit 201a is displayed, and is a left side when viewed from the user in front of the display unit 201a. The left side of the display unit 201a is a left side in a case of facing a direction in which a video image of the display unit 201a is displayed, and is a right side when viewed from the user in front of the display unit 201a.

Different UIDs are set for the individual display units 201a.

Since the individual display units 201a are placed side by side at the same height in the horizontal direction, different values are set as the position X, and the same value is set as the position Y.

Since a curvature in the horizontal direction of the display units 201a-1 and 201a-2 is 3000 mm, the curvature X is set to 3000 mm. Since a curvature in the horizontal direction of the display units 201a-3 and 201a-4 is 1500 mm, the curvature X is set to 1500 mm.

Whereas, since the display units 201a-1 to 201a-4 are not curved in the vertical direction, no value is set for the curvature Y.

The connection angle 1, the connection angle 2, the connection angle 3, and the connection angle 4 indicate connection angles of an upper side, a right side, a lower side, and a left side of the display 216 of display unit 201b, respectively.

The display units 201a-1 to 201a-4 are smoothly connected to a display unit 201b adjacent at all four sides. Therefore, no value is set for the connection angles 1 to 4.

However, since curvatures in the X direction are different, strictly speaking, the display unit 201a-2 and the display unit 201a-3 cannot be completely smoothly connected to each other. On the other hand, for example, shapes of end portions of both units may be set so as to have a common curvature in a portion where both units are connected.

Figure 18:
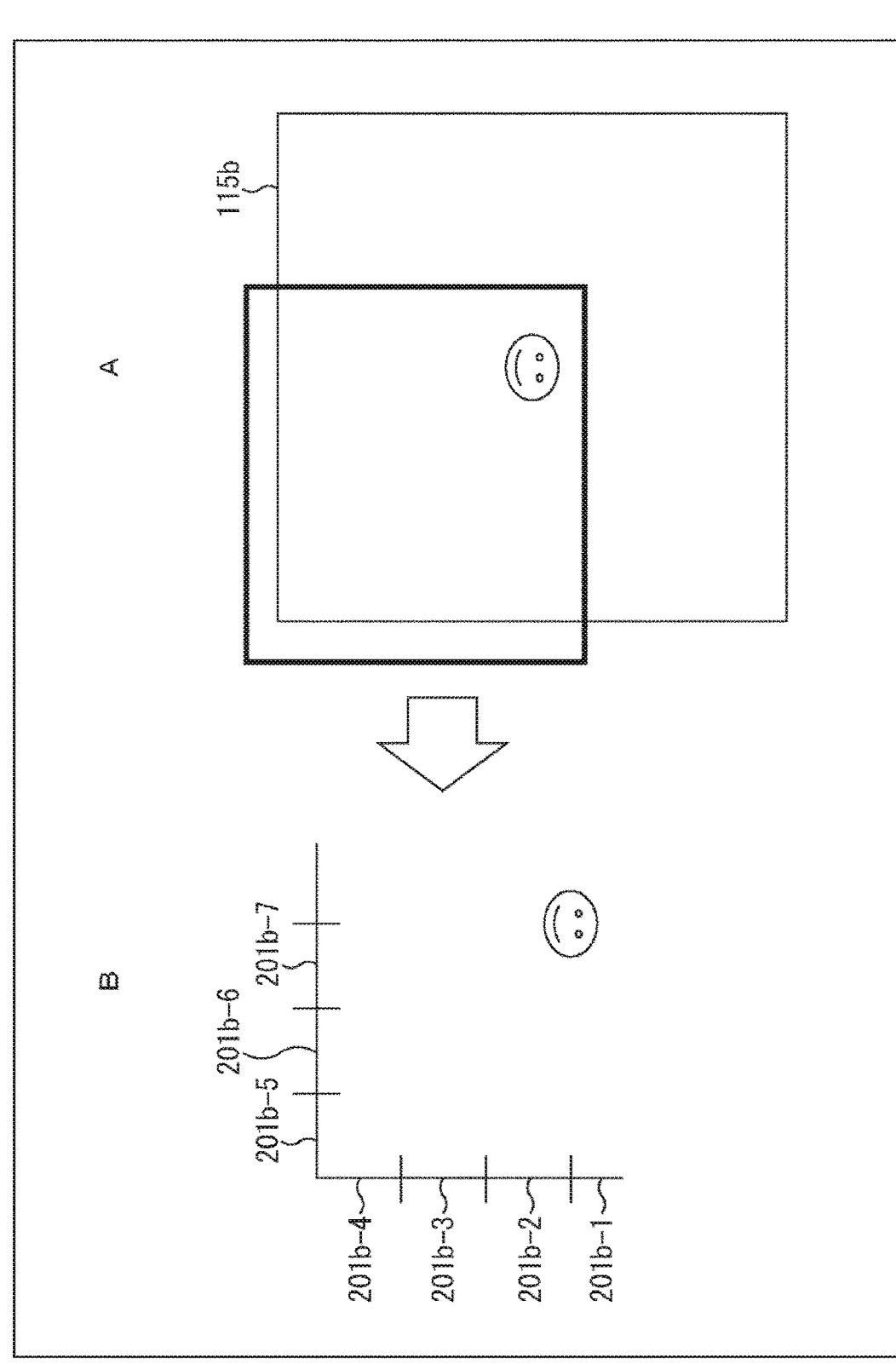
FIGS. 18A and 18B are views schematically illustrating a configuration example of the display part.
Figure 20:
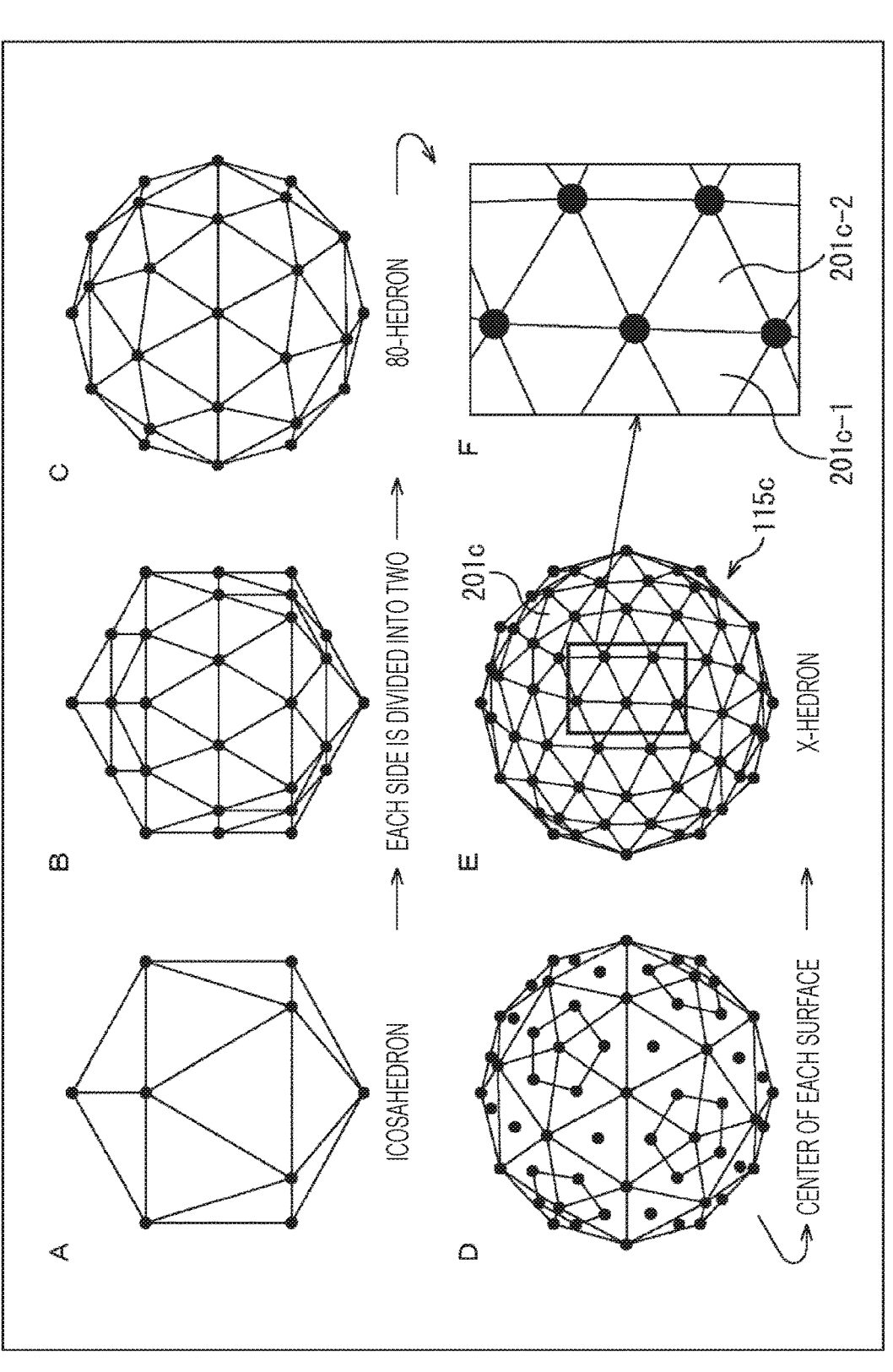
FIGS. 20A, 20B, 20C, 20D, 20E, and 20F are views schematically illustrating a configuration example of the display part.
Figure 22:
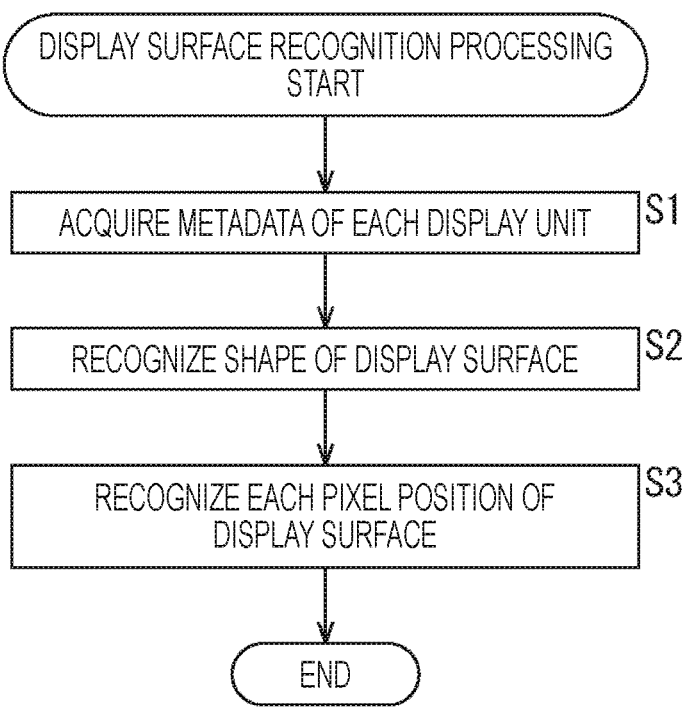
FIG. 22 is a flowchart for explaining display surface recognition processing executed by the display controller.

FIGS. 18A and 18B schematically illustrate a configuration example of a display part 115b which is one embodiment of the display part 115. FIG. 18A is a schematic view of the display part 115b as viewed from above, and FIG. 18B is an enlarged view of a portion surrounded by a square in FIG. 18A.

The display part 115b is installed in a square shape so as to surround around the user when viewed from above. The display part 115 is configured by flat display units 201b having the same shape, and is bent at 90 degrees at four corners. That is, the display part 115 includes non-smooth surfaces at the four corners, and the display units 201*b* are non-smoothly connected at an angle of 90 degrees.

FIG. 19 illustrates a specific example of a parameter table of display units 201*b*-3 to 201*b*-6 among the display units 201*b*-1 to 201*b*-7 illustrated in FIG. 18B.

Since all the individual display units 201*b* are units of the same specification, the same values are set for the shapes, the curvature radii X, the curvature radii Y, the pixel pitches, and the side lengths 1 to 4 of the individual display units 201*b*.

Note that the side length 1, the side length 2, the side length 3, and the side length 4 indicate lengths of an upper side, a right side, a lower side, and a left side of the display unit 201*b*, respectively. Furthermore, since the display 216 of each display unit 201*b* has a planar shape, no values are set for the curvature radius X and the curvature radius Y.

Different UIDs are set for the individual display units 201*b*.

Since the individual display units 201*b* are placed side by side at the same height in the horizontal direction, different values are set as the position X, and the same value is set as the position Y.

The connection angle 1, the connection angle 2, the connection angle 3, and the connection angle 4 indicate connection angles of an upper side, a right side, a lower side, and a left side of the display 216 of display unit 201*b*, respectively.

The display units 201*a*-3 and 201*a*-6 are smoothly connected to a display unit 201*b* adjacent at all four sides. Therefore, no value is set for the connection angles 1 to 4.

Whereas, an upper side, a right side, and a lower side of the display unit 201*b*-4 are smoothly connected to adjacent display units 201*b*. Therefore, no value is set for the connection angles 1 to 3. On the other hand, a left side of the display unit 201*b*-4 is connected to a right side of a display of the display unit 201*b*-5 at an angle of 90 degrees. Therefore, the connection angle 4 is set to 90 degrees.

Whereas, an upper side, a lower side, and a left side of the display unit 201*b*-5 are smoothly connected to adjacent display units 201*b*. Therefore, no values are set for the connection angle 1, the connection angle 3, and the connection angle 4. On the other hand, a right side of the display unit 201*b*-5 is connected to a left side of a display of the display unit 201*b*-4 at an angle of 90 degrees. Therefore, the connection angle 2 is set to 90 degrees.

FIGS. 20A, 20B, 20C, 20D, 20E, and 20F schematically illustrate a configuration example of a display part 115*c* which is one embodiment of the display part 115.

In general, a triangular display unit is suitable for an LED display in a tiling configuration having a spherical shape or a shape (a dome shape) obtained by cutting out a part of a spherical surface. Specifically, as illustrated in FIGS. 20A, 20B, 20C, and 20D, it is known that a set of triangles approximates a spherical surface by subdividing a triangle constituting a display surface of the LED display. A pseudo spherical structure formed by the set of triangles is actually applied to, for example, a wire frame or the like on a surface of a dome-shaped radar device.

FIG. 20E schematically illustrates a configuration example of the display part 115*c* which is one embodiment of the display part 115. The display part 115*c* is configured by a substantially spherical X-hedron LED display configured by combining triangular display units 201*c* having a curved surface shape (having a curvature). FIG. 20E is an enlarged view of the vicinity of display units 201*c*-1 and 201*c*-2 of the display part 115*c* of FIG. 20E.

FIG. 21 illustrates a specific example of a parameter table of the display units 201*c*-1 and 201*c*-2 illustrated in of FIG. 20E.

Since all the individual display units 201*c* are units of the same specification, the same values are set for the shapes, the curvature radii X, the curvature radii Y, the pixel pitches, and the side lengths 1 to 3 of the individual display units 201*c*. Note that a left-right direction (an X-axis) and an up-down direction (a Y-axis) of the display unit 201*c* serving as a reference of the curvature radius X and the curvature radius Y may be regarded as being determined at the time of manufacturing the display unit 201*c*.

Note that the side lengths 1 to 3 indicate lengths of three sides of the display unit 201*c*, respectively. Note that, since the shape of the display unit 201*c* is an equilateral triangle, the side lengths 1 to 3 are set to the same 400 mm. Furthermore, both the curvature radius X and the curvature radius Y are set to 1500 mm.

Different UIDs are set for the individual display units 201*c*.

Since the display units 201*c*-1 and 201*c*-2 are placed side by side at the same height in the horizontal direction, different values are set as the position X, and the same value is set as the position Y.

The connection angles 1 to 3 indicate connection angles of individual sides of the display unit 201*c*. Each display unit 201*c* is smoothly connected to the display units 201*c* adjacent to each side. Therefore, no value is set for the connection angles 1 to 3.

<Processing of Display Controller 151>

Next, processing of the display controller 151 will be described with reference to FIGS. 22, 23, 24, 25A, 25B, 26, and 27.

<Display Surface Recognition Processing>

First, display surface recognition processing executed by the display controller 151 will be described with reference to a flowchart of FIG. 22.

This processing is executed, for example, at the time of assembling or installing the display part 115. Alternatively, this processing is executed as initial setting when the user views a video image, for example.

In step S1, the recognition unit 181 acquires metadata of each display unit 201. Specifically, the recognition unit 181 receives a metadata signal including metadata of each display unit 201 from each display unit 201 constituting the display part 115, via the communication unit 166 or the input/output unit 167.

In step S2, the recognition unit 181 recognizes a shape of the display surface. That is, the recognition unit 181 recognizes a shape of the display surface of the display part 115 on the basis of the metadata of each display unit 201.

For example, the recognition unit 181 recognizes a two-dimensional and relative positional relationship of the individual display units 201 on the basis of the position X and the position Y of each display unit 201. Next, the recognition unit 181 calculates a three-dimensional shape of the display surface of the display part 115 configured as a continuous surface by connecting the individual display units 201, on the basis of the shape of each display unit 201, the curvature radius X and the curvature radius Y, the side lengths 1 to n, and the connection angles 1 to n.

On the basis of the calculation result, the recognition unit 181 constructs, in a virtual space, a three-dimensional model (hereinafter, referred to as a display surface model) representing the three-dimensional shape of the display surface of the display part 115.

Note that a position at which the display surface model is arranged in the virtual space may be freely determined. For example, one point of an end portion of the display surface model may be arranged at an origin of the virtual space. Alternatively, for example, the display surface model may be moved in the virtual space in accordance with a position of a virtual camera to be described later.

In step S3, the recognition unit 181 recognizes each pixel position of the display surface. Specifically, the recognition unit 181 arranges pixels in an area corresponding to each display unit 201 of the display surface model, on the basis of a pixel pitch of each display unit 201. As a result, the pixel position of the display surface of the display part 115 is recognized.

Thereafter, the display surface recognition processing ends.

Note that the processing in step S3 may be performed simultaneously with the processing in step S2.

In this way, the shape and the pixel position of the display surface of the display part 115 are easily recognized only by calculation based on the metadata of each display unit 201, without using a depth sensor.

As a result, a load of the recognition processing of the shape and the pixel position of the display surface is reduced. Furthermore, since it is not necessary to use a depth sensor, a projector, or the like, cost reduction is achieved. Moreover, the pixel position of the display surface is accurately recognized on the basis of the pixel pitch or the like.

<Video Correction Processing>

Figure 23:
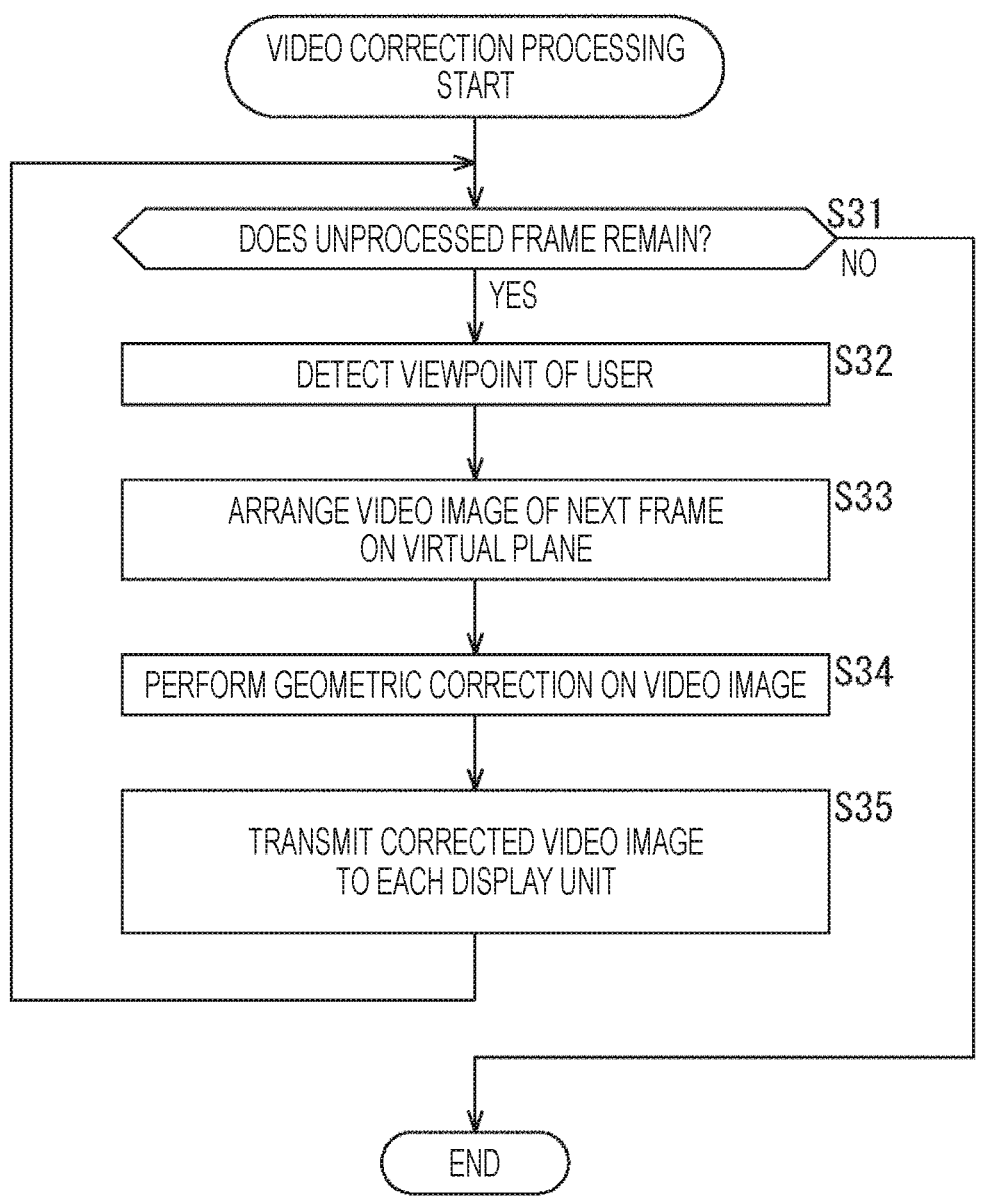
FIG. 23 is a flowchart for explaining video correction processing executed by the display controller.

Next, video correction processing executed by the display controller 151 will be described with reference to a flow-chart of FIG. 23.

This processing is started, for example, when the CPU 161 receives an input video signal transmitted from the output unit 111, via the communication unit 166 or the input/output unit 167.

In step S31, the video correction unit 183 determines whether or not an unprocessed frame remains. When it is determined that an unprocessed frame remains in an input video signal that has been received or is being received, the processing proceeds to step S32.

In step S32, the detection unit 182 detects a viewpoint of the user. Any technique can be used for detecting the viewpoint of the user. Here, an example of a detection method for the viewpoint of the user will be described.

For example, a visible light camera constituting the image-capturing unit 112 is installed on a mount member for fixing the display part 115, a frame for fixing the display part 115, or the like. Furthermore, for example, the visible light camera is independently installed at a position (for example, a ceiling, a wall, or the like of a space in which the display part 115 is installed) away from the display part 115 and peripheral devices (for example, the output unit 111 and the control unit 114).

The visible light camera captures an image of an area including a head part of the user, and transmits an obtained captured video image signal to the display controller 151.

On the other hand, the detection unit 182 acquires the captured video image signal via the communication unit 166 or the input/output unit 167. The detection unit 182 detects a position of the viewpoint of the user on the basis of a captured video image based on the captured video image signal.

Note that, since the installation position of the visible light camera is known, a positional relationship between the display surface of the display part 115 and the visible light camera is also known. Therefore, the detection unit 182 can estimate a relative position of the viewpoint of the user with respect to the display surface of the display part 115, on the basis of the position of the viewpoint of the user detected on the basis of the captured video image.

Alternatively, for example, an infrared (IR) camera constituting the image-capturing unit 112 is installed at a position similar to that of the visible light camera described above. Furthermore, a marker is attached to the user's face or glasses.

The IR light camera captures an image of an area including a head part of the user, and transmits an obtained captured video image signal to the display controller 151.

On the other hand, the detection unit 182 acquires the captured video image signal via the communication unit 166 or the input/output unit 167. The detection unit 182 detects a position of the marker on the basis of a captured video image based on the captured video image signal. Then, the detection unit 182 estimates a position of the viewpoint of the user on the basis of the detected position of the marker.

Note that, since the installation position of the IR light camera is known, a positional relationship between the display surface of the display part 115 and the IR light camera is also known. Therefore, the detection unit 182 can estimate a relative position of the viewpoint of the user with respect to the display surface of the display part 115, on the basis of the position of the viewpoint of the user estimated on the basis of the captured video image.

Furthermore, for example, the self-position estimation unit 113 estimates a self-position of the user, and transmits a self-position estimation signal including an estimation result to the display controller 151.

On the other hand, the detection unit 182 acquires the self-position estimation signal via the communication unit 166 or the input/output unit 167. The detection unit 182 estimates a position of the viewpoint of the user on the basis of the estimation result of the self-position of the user.

In this case, for example, a position of a predetermined portion of the display surface of the display part 115 in the three-dimensional coordinate system is measured in advance and stored in the memory 162 of the display controller 151. Then, the detection unit 182 can estimate the relative position of the viewpoint of the user with respect to the display surface of the display part 115, on the basis of the position of the display surface of the display part 115 and the current position of the user.

Next, the detection unit 182 arranges the viewpoint of the user in the virtual space on the basis of the relative position of the viewpoint of the user with respect to the display surface of the display part 115.

In step S33, the video correction unit 183 arranges a video image of a next frame on a virtual plane.

Specifically, the video correction unit 183 arranges a virtual plane having a predetermined size at a predetermined position between the display surface model and the view-point of the user in the virtual space. The size of the virtual plane is represented by the number of virtual pixels in a vertical direction and a lateral direction.

Note that the position and the size of the virtual plane are fixed regardless of a movement of the viewpoint of the user. That is, the position and the size of the virtual plane with respect to the display surface model are fixed.

Next, the video correction unit 183 arranges, on the virtual plane, an input video image of a next frame based on an input video signal. Specifically, when a size (the number of pixels) of the input video image does not match the size (the number of pixels) of the virtual plane, the video correction unit 183 adjusts the size of the input video image to the size of the virtual plane. For example, the video correction unit 183 adjusts the size of the input video image to the size of the virtual plane by trimming the input video image, thinning out pixels, or interpolating pixels. Then, the video correction unit 183 arranges a pixel signal of each pixel of the input video image at a position of each virtual pixel of the virtual plane.

In step S34, the video correction unit 183 performs geometric correction on the video image. For example, the video correction unit 183 arranges a virtual camera with respect to the virtual plane on the basis of the position of the viewpoint of the user in the virtual space. Next, the video correction unit 183 connects the viewpoint of the user and each virtual pixel on the virtual plane with a straight line (light beam). Next, the video correction unit 183 detects a pixel at an intersection point between each straight line and the display surface model. As a result, the virtual pixels on the virtual plane on the same straight line are associated with the pixels on the display surface model.

Then, the video correction unit 183 generates an output video image by arranging the pixel signal of each pixel of the input video image arranged in each virtual pixel of the virtual screen, in each corresponding pixel of the display surface model.

In this way, the geometric correction on the input image is performed on the basis of the shape and the pixel position of the display surface of the display part 115 and the position of the viewpoint of the user, and the output image is generated.

In step S35, the display controller 151 outputs the corrected video image to each display unit 201. Specifically, the display control unit 185 divides the output video image generated by the processing in step S34 for every area corresponding to the display 216 of each display unit 201. Next, the display control unit 185 individually generates an output video signal including the output video image of each divided area. Then, the display control unit 185 individually outputs an output video signal corresponding to each display unit 201, to each display unit 201 via the communication unit 166 or the input/output unit 167.

On the other hand, the display control unit 243 of each display unit 201 causes the display 216 to display the output video image based on the output video signal. As a result, the geometrically corrected video image is displayed on the display surface of the display part 115.

Thereafter, the processing returns to step S31, and the processing of steps S31 to S35 is repeatedly executed until it is determined in step S31 that no unprocessed frame remains.

Whereas, when it is determined in step S31 that no unprocessed frame remains, the video correction processing ends.

In this manner, the geometrically corrected video image is displayed on the display surface of the display part 115. As a result, regardless of the position of the viewpoint of the user, a video image without geometric distortion as viewed from the user is displayed on the virtual plane.

<Display Layout Setting Processing>

Figure 24:
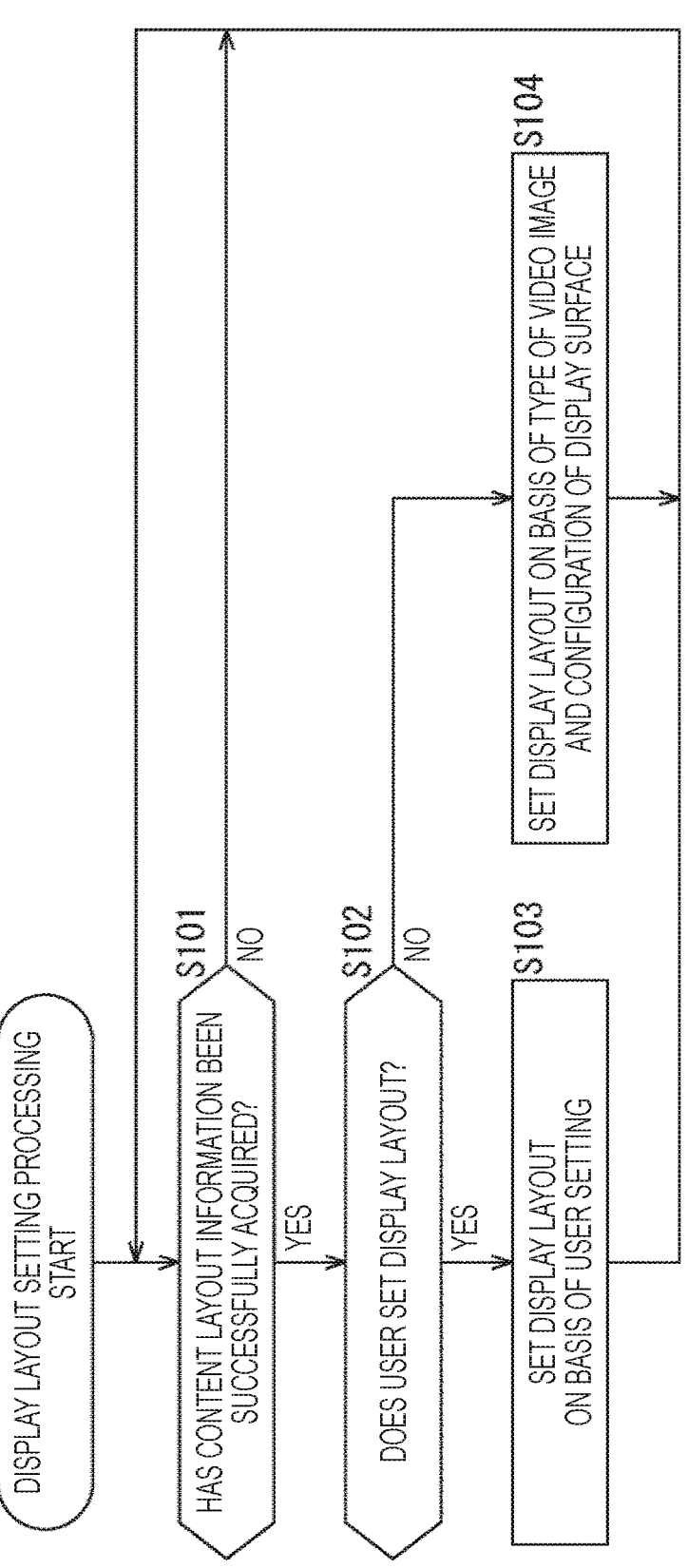
FIG. 24 is a flowchart for explaining display layout setting processing executed by the display controller.

Next, display layout setting processing executed by the display controller 151 will be described with reference to a flowchart of FIG. 24.

Figure 25:
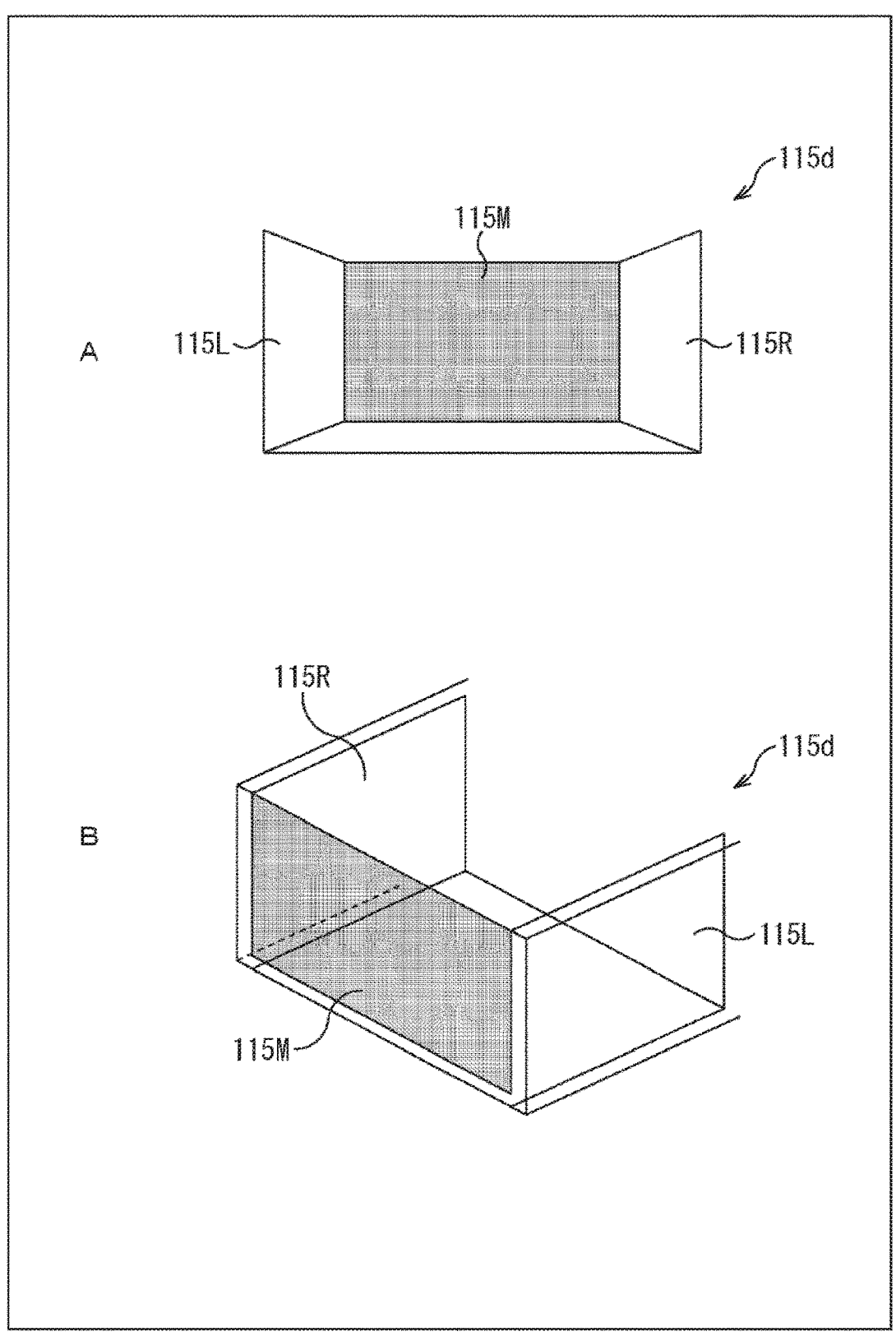
FIGS. 25A and 25B are views illustrating a configuration example of the display part.

Note that a case where a display part 115*d* illustrated in FIGS. 25A and 25B are used will be described below. A display surface of the display part 115*d* is largely sectioned into a display surface 115L, a display surface 115M, and a display surface 115R. The display surface 115M is arranged in front of the user (not illustrated). The display surface 115L is bent by 90 degrees with respect to the display surface 115M, and is arranged in a left direction of the user. The display surface 115R is bent by 90 degrees with respect to the display surface 115M, and is arranged in a right direction of the user. Therefore, connection is non-smoothly made between the display surfaces 115M and 115L and between the display surfaces 115M and 115L, and there is a non-smooth surface having a corner.

This processing is started when power of the display controller 151 is turned on, and is ended when the power is turned off, for example.

In step S101, the layout setting unit 184 determines whether or not content layout information has been acquired. This processing is repeatedly executed until it is determined that the content layout information has been acquired.

Whereas, in step S101, for example, when the layout setting unit 184 receives the content layout information transmitted from the output unit 111 via the communication unit 166 or the input/output unit 167, the layout setting unit 184 determines that the content layout information has been acquired, and the processing proceeds to step S102.

Figure 26:
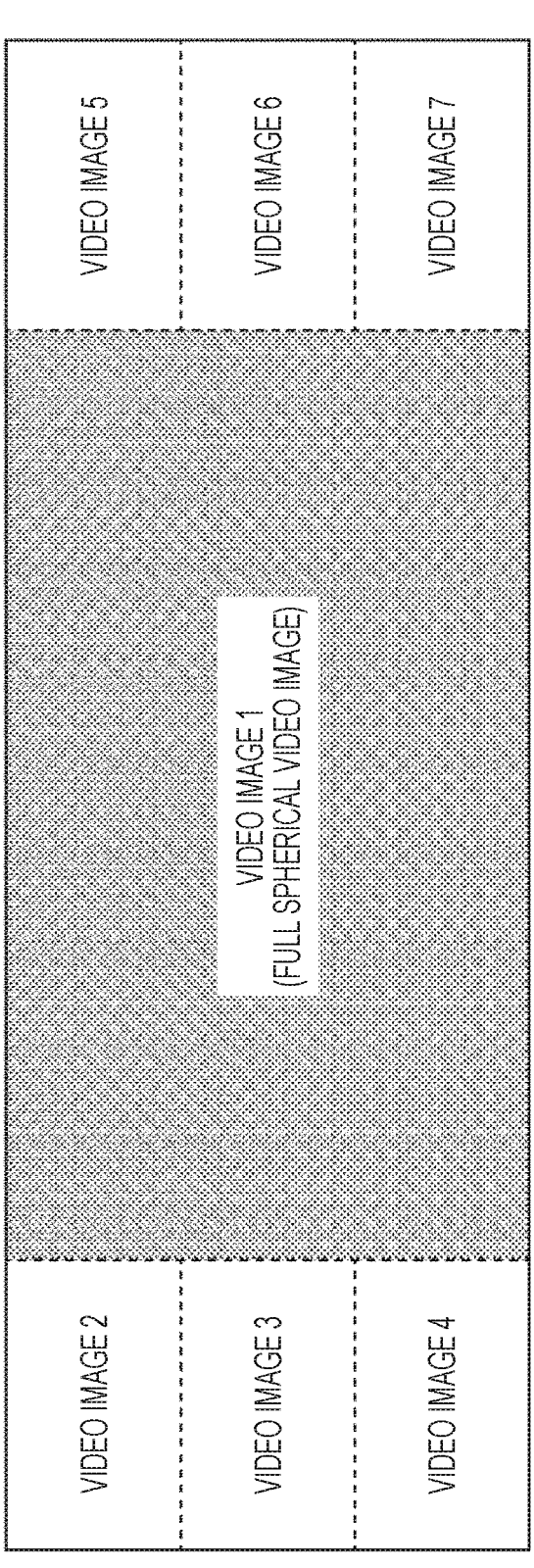
FIG. 26 is a view illustrating a configuration example of a content layout.

FIG. 26 illustrates an example of a content layout indicated by the content layout information. In this example, seven contents of video images 1 to 7 are arranged. Specifically, the video image 1 is arranged at a center of the layout. The video images 2 to 4 are vertically arranged on a left side of the video image 1. The video images 5 to 7 are vertically arranged on a right side of the video image 1.

The video image 1 is, for example, a three-dimensional video image such as a full spherical moving image. The video images 2 to 7 are, for example, two-dimensional video images such as a 16:9 video image, an HD video image, and a 4K video image.

In step S102, the layout setting unit 184 determines whether or not the user is to set the display layout. When it is determined that the user is to set the display layout, the processing proceeds to step S103.

In step S103, the layout setting unit 184 sets the display layout on the basis of the user setting. For example, the layout setting unit 184 arranges the video images 1 to 7 in FIG. 26 on the display surfaces 115L to 115R of the display part 115*d* in FIGS. 25A and 25B, on the basis of an instruction from the user.

Thereafter, the processing returns to step S101, and the processing in and after step S101 are executed.

Whereas, when it is determined in step S102 that the user is not to set the display layout, the processing proceeds to step S104.

In step S104, the layout setting unit 184 sets the display layout on the basis of a type of the video image and a configuration of the display surface.

For example, the layout setting unit 184 sets the display layout such that each video image does not overlap with a corner of the display part 115*d*. For example, the layout setting unit 184 sets the display layout such that the video image 1 is displayed on the display surface 115M, the video images 2 to 4 are displayed on the display surface 115L, and the video images 5 to 7 are displayed on the display surface 115R.

Whereas, when the video image has to overlap with a corner of the display part 115*d* due to a relationship of a size of the video image or the like, the layout setting unit 184 sets the display layout such that a two-dimensional video image does not overlap with a corner of the display part 115.

Figure 27:
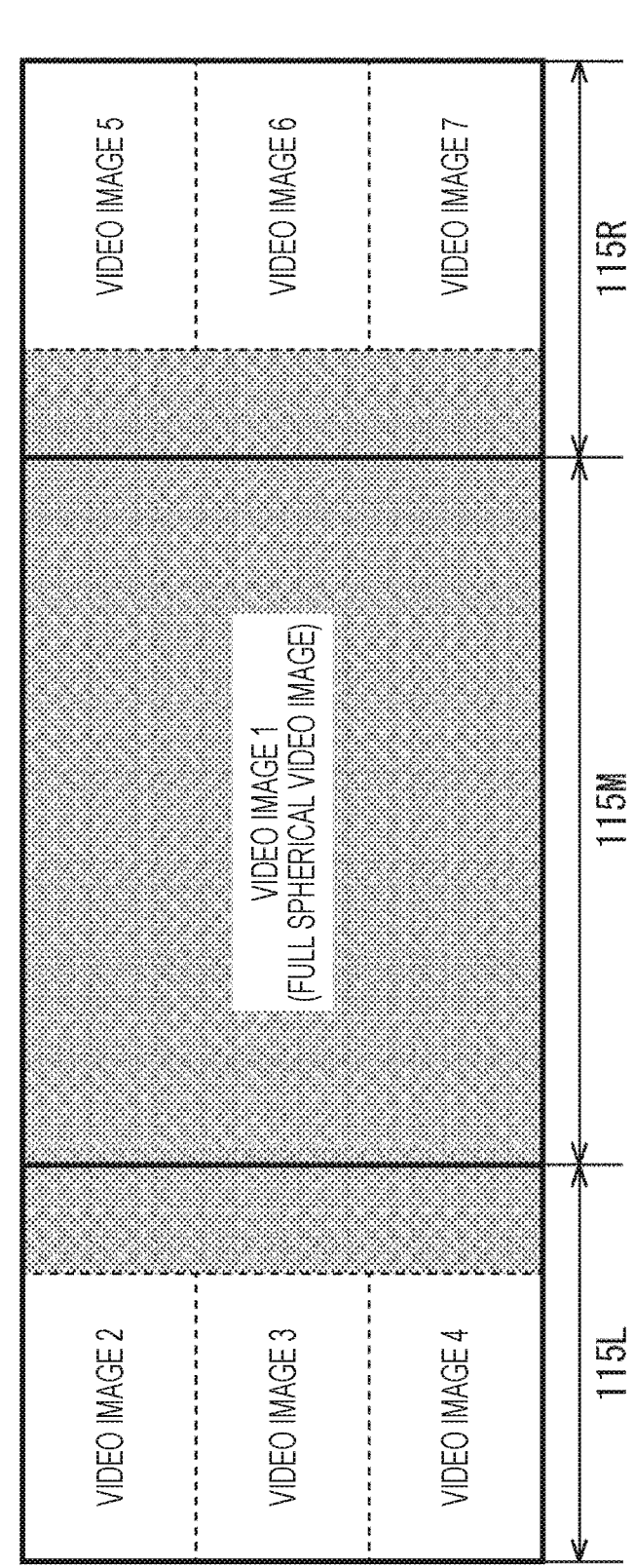
FIG. 27 is a view illustrating a setting example of a display layout.

For example, as illustrated in FIG. 27, the video image 1 which is a three-dimensional video image is arranged so as to overlap with a corner between the display surface 115M and the display surface 115L and a corner between the display surface 115M and the display surface 115R. Whereas, the video images 2 to 4 are arranged on the display surface 115L so as not to overlap with the corner between the display surface 115M and the display surface 115L. Furthermore, the video images 5 to 7 are arranged on the display surface 115R so as not to overlap with the corner between the display surface 115M and the display surface 115R.

This is because a three-dimensional video image can be subjected to three-dimensional geometric correction by the above-described method, whereas a two-dimensional video image is difficult to be subjected to three-dimensional geometric correction by the above-described method. That is, by arranging the two-dimensional video image so as not to overlap with a corner of the display surface, geometric correction on the two-dimensional video image becomes unnecessary, and visibility for the two-dimensional video image is improved. Whereas, even if the three-dimensional video image is arranged so as to overlap with a corner of the display surface, visibility for the three-dimensional video image can be improved by performing geometric correction by the above-described method.

5. Modification

Hereinafter, a modification of the above-described embodiment of the present technology will be described.
<Modification Regarding Metadata>

A type of metadata (parameters) described above can be changed as necessary.

For example, an absolute position of the display unit 201 in the three-dimensional coordinate system may be used instead of the position X and the position Y. In this case, for example, the absolute position and orientation of the display unit 201 are detected using the IMU or the like included in the sensing unit 219 of the display unit 201.

For example, when specifications are determined in advance so as not to form a non-smooth surface on the display surface of the display part 115, the connection angles 1 to n can be omitted.

For example, a value of the connection angle may also be set for a direction in which the display unit 201 is curved.

For example, some or all of the metadata of each display unit 201 may be transmitted to and stored in a device (for example, a cloud server, a dedicated server, or the like) external to the video processing system 101. In this case, the display controller 151 acquires metadata of each display unit 201 from the external device as necessary.
<Modification Regarding Video Correction>

For example, a video image may be corrected on the basis of a field of view of the user instead of a viewpoint of the user. In this case, for example, a virtual plane may be moved in accordance with the field of view of the user. For example, the virtual plane may be moved so as to be within the field of view of the user.

Note that any technique can be used as a detection method for the field of view of the user.

For example, a visible light camera may capture an image of a head part of the user, and the detection unit 182 may estimate the field of view of the user on the basis of the captured video image.

For example, an IR camera may capture an image of a head part of the user in a state where a marker is attached to the face or the glasses, and the detection unit 182 may detect a position of the marker on the basis of the captured video image and estimate the field of view of the user on the basis of the position of the marker.

For example, the detection unit 182 may estimate the position of the head part of the user on the basis of a self-position estimation result of the user obtained by the self-position estimation unit 113, and estimate the field of view of the user on the basis of the position of the head part of the user.

Furthermore, for example, multiple virtual planes may be set, and the virtual plane to be used may be switched on the basis of a line-of-sight or a field of view of the user. For example, a virtual plane closest to a direction of the line-of-sight or the field of view of the user may be used among the multiple virtual planes. As a result, for example, when the display surface of the display part 115 has a dome shape, it is possible to display a video image with less geometric distortion to the user regardless of a direction in which the user faces.
<Other Modifications>

For example, the display part 115 can be configured by a light-field display. This is achieved, for example, by providing a lenticular sheet, which is a member in which lenticular lenses are arranged in a sheet shape, on the display surface of the display part 115.

However, to an LED display capable of forming any three-dimensional shape, it is difficult to provide the lenticular sheet with high accuracy after installation. Therefore, it is desirable that the lenticular sheet is individually provided on the display 216 of each display unit 201, at the time of manufacturing each display unit.

Note that the memory 212 of the display unit 201 provided with the lenticular sheet stores metadata regarding the lenticular sheet, in addition to the metadata described above. For example, parameters such as a thickness, a refractive index, and a pitch width of the lenticular lens are stored in the memory 212, at the time of manufacturing the display unit 201.

In this case, for example, the detection unit 182 detects an interocular distance of the user on the basis of the captured video image or the like.

Alternatively, a predetermined value (for example, an average value of general interocular distances) may be used for the interocular distance. In this case, for example, when the user first views a video image on the display part 115, it is desirable to calibrate a parallax image by a known technique to correct the value of the interocular distance.

The video correction unit 183 generates a left-eye video image and a right-eye video image from an input video image, for example, on the basis of the metadata regarding the lenticular sheet and the interocular distance of the user. Furthermore, the video correction unit 183 performs geometric correction on the left-eye video image and the right-eye video image by using the above-described method. In this case, for example, a viewpoint or a field of view of the left eye of the user is used for geometric correction of the left-eye video image, and a viewpoint or a field of view of the right eye of the user is used for the geometric correction of the right-eye video image. As a result, the user can stereoscopically view a video image without geometric distortion, with the naked eye.

Note that the input video image may include the left-eye video image and the right-eye video image.

The present technology can also be applied to, for example, a system that displays a video image by combining self-luminous display units using light emitting elements other than LEDs as pixels.

6. Others

<Computer Configuration Example>

The above-described series of processing can be executed by hardware or software. When the series of processing is executed by software, a program constituting the software is installed in a computer. Here, the computer includes a computer incorporated in dedicated hardware, a general-purpose personal computer capable of executing various functions by installing various programs, and the like, for example.

Figure 28:
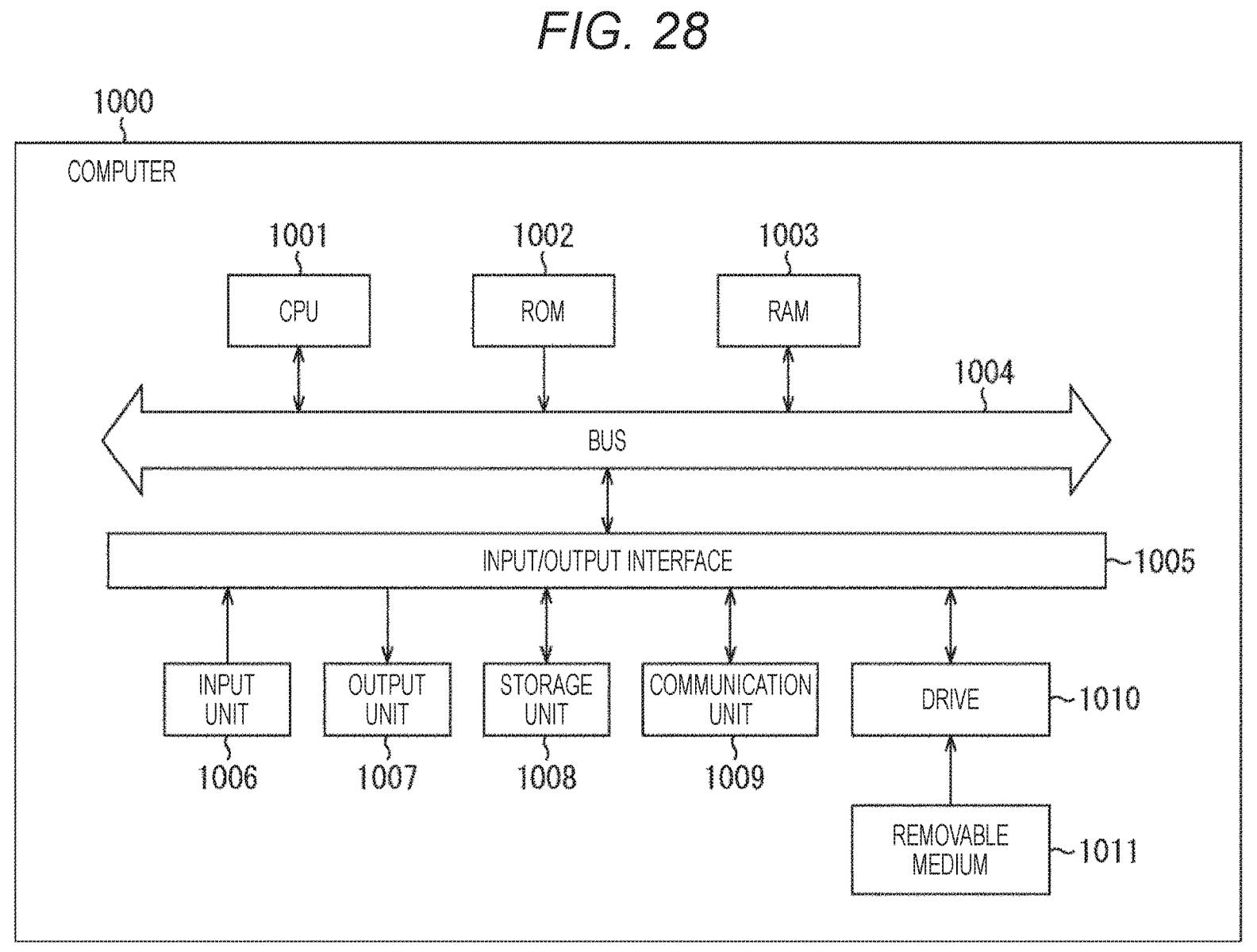

FIG. 28 is a block diagram illustrating a configuration example of hardware of a computer that executes the series of processes described above in accordance with a program.

In a computer 1000, a central processing unit (CPU) 1001, a read only memory (ROM) 1002, and a random access memory (RAM) 1003 are mutually connected by a bus 1004.

An input/output interface 1005 is further connected to the bus 1004. An input unit 1006, an output unit 1007, a recording unit 1008, a communication unit 1009, and a drive 1010 are connected to the input/output interface 1005.

The input unit 1006 includes an input switch, a button, a microphone, an imaging element, and the like. The output unit 1007 includes a display, a speaker, and the like. The recording unit 1008 includes a hard disk, a nonvolatile memory, and the like. The communication unit 1009 includes a network interface and the like. The drive 1010 drives a removable medium 1011 such as a magnetic disk, an optical disk, a magneto-optical disk, or a semiconductor memory.

In the computer 1000 configured as described above, for example, the CPU 1001 loads a program recorded in the recording unit 1008 into the RAM 1003 via the input/output interface 1005 and the bus 1004 and executes the program, whereby the above-described series of processing is performed.

The program executed by the computer 1000 (CPU 1001) can be provided by being recorded in the removable medium 1011 as a package medium or the like, for example. Furthermore, the program can be provided via a wired or wireless transmission medium such as a local area network, the Internet, or digital satellite broadcasting.

In the computer 1000, the program can be installed in the recording unit 1008 via the input/output interface 1005 by attaching the removable medium 1011 to the drive 1010. Furthermore, the program can be received by the communication unit 1009 via a wired or wireless transmission medium and installed in the recording unit 1008. Furthermore, the program can be installed in the ROM 1002 or the recording unit 1008 in advance.

Note that the program executed by the computer may be a program in which processing is performed in time series in the order described in the present specification, or may be a program in which processing is performed in parallel or at necessary timing such as when a call is made or the like.

Furthermore, in the present specification, a system means a set of a plurality of components (devices, modules (parts), or the like), and it does not matter whether or not all the components are in the same housing. Therefore, a plurality of devices housed in separate housings and connected via a network and one device in which a plurality of modules is housed in one housing are both systems.

Moreover, the embodiments of the present technology are not limited to the above-described embodiments, and various modifications can be made without departing from the gist of the present technology.

For example, the present technology can have a configuration of cloud computing in which one function is shared and processed in cooperation by a plurality of devices via a network.

Furthermore, each step described in the above-described flowcharts can be executed by one device or can be shared and executed by a plurality of devices.

Moreover, when a plurality of processes is included in one step, the plurality of processes included in the one step can be executed by one device or can be shared and executed by a plurality of devices.

<Example of Combination of Configurations>

The present technology can also have the following configurations.

(1)

An information processing apparatus including:

a communication unit configured to receive metadata regarding attributes and positions of multiple display units of a self-luminous type, the multiple display units constituting a display surface configured to display a video image; and a recognition unit configured to recognize a shape and a pixel position of the display surface on the basis of the metadata of each of the display units.

(2)

The information processing apparatus according to (1) above, in which the metadata includes at least one among identification information, a shape, a size, a pixel pitch, a relative position, and an absolute position of each of the display units, and an angle between the display units.

(3)

The information processing apparatus according to (2) above, in which the recognition unit recognizes a three-dimensional shape of the display surface on the basis of a shape, a size, and a relative position or an absolute position of each of the display units, and on the basis of an angle between the display units each.

(4)

The information processing apparatus according to (3) above, in which the recognition unit recognizes a shape of a corner of the display surface on the basis of an angle between the display units each.

(5)

The information processing apparatus according to (3) or (4) above, in which the metadata includes a curvature or a curvature radius of each of the display units, and the recognition unit recognizes a three-dimensional shape of the display surface having a curved surface, on the basis of a shape, a size, a relative position or an absolute position, and a curvature or a curvature radius of each of the display units, and on the basis of an angle between the display units each.

(6)

The information processing apparatus according to (5) above, in which the display surface has a spherical surface or a shape obtained by cutting out a part of a spherical surface, and the metadata includes a curvature or a curvature radius in two orthogonal directions of each of the display units.

(7)

The information processing apparatus according to (6) above, in which the display surface is configured by placing, side by side, multiple triangular display units having a curved surface shape.

(8)

The information processing apparatus according to any one of (2) to (7) above, in which the recognition unit recognizes a pixel position of the display surface on the basis of an area of each of the display units on the display surface and on the basis of a pixel pitch of each of the display units.

(9)

The information processing apparatus according to any one of (1) to (8) above, further including:

a detection unit configured to detect a field of view or a visual point of a user; and a video correction unit configured to perform geometric correction on the video image, on the basis of a shape and a pixel position of the display surface and on the basis of a field of view or a viewpoint of the user.

(10)

The information processing apparatus according to (9) above, in which on the basis of a field of view or a viewpoint of the user, the video correction unit performs geometric correction on the video image by associating a pixel position of the display surface with a pixel position of the video image on a virtual plane between the display surface and the user.

(11)

The information processing apparatus according to (10) above, in which the video correction unit performs geometric correction on video images for a left eye and a right eye of the user, on the basis of a shape and a pixel position of the display surface, and on the basis of a viewpoint or a field of view of the left eye and the right eye of the user.

(12)

The information processing apparatus according to any one of (1) to (11) above, further including a layout setting unit configured to set a layout of multiple video images on the display surface, on the basis of a type of the multiple video images to be displayed on the display surface and a shape of the display surface.

(13)

The information processing apparatus according to (12) above, further including the layout setting unit that sets a layout of the multiple video images such that a two-dimensional video image among the multiple video images does not overlap with a corner of the display surface.

(14)

The information processing apparatus according to any one of (1) to (13) above, in which the communication unit individually receives the metadata from each of the display units.

(15)

An information processing method including:

receiving metadata regarding attributes and positions of multiple display units of a self-luminous type, the multiple display units constituting a display surface configured to display a video image; and recognizing a shape and a pixel position of the display surface on the basis of the metadata of each of the display units.

(16)

A display device including:

a display of a self-luminous type;

a memory configured to store metadata related to an attribute and a position of the display;

a connection unit connectable to another display device; and a transmission control unit configured to control transmission of the metadata to an information processing apparatus, the information processing apparatus being configured to recognize a shape and a pixel position of a display surface configured by the display and another display of the another display device.

(17)

The display device according to (16) above, in which the metadata includes at least one among a shape, a size, a pixel pitch, a curvature or a curvature radius, a relative position, and an absolute position of the display, an angle between the display and the another display that is adjacent, and identification information of the display device.

(18)

The display device according to (17) above, further including a metadata generation unit configured to set the identification information in cooperation with the another display device, and cause the memory to store the identification information.

(19)

The display device according to (17) or (18) above, further including:

an operation unit configured to set an angle between with the another display that is adjacent; and a metadata generation unit configured to cause the memory to store an angle set by the operation unit.

(20)

The display device according any one of (17) or (18) above, further including a metadata generation unit configured to detect an angle between with the another display that is adjacent, and cause the memory to store the detected angle.

(21)

The display device according to any one of (17) to (20) above, further including a metadata generation unit configured to detect a relative position of the display in cooperation with the another display device, and cause the memory to store the detected relative position.

(22)

The display device according to any one of (16) to (21) above, in which a lenticular sheet is provided on a surface of the display, and the metadata includes an attribute of the lenticular sheet.

Note that the effects described in the present specification are merely examples and are not limited, and other effects may be present.

REFERENCE SIGNS LIST

101 Video processing system
111 Output unit
112 Image-capturing unit
113 Self-position estimation unit
114 Control unit
115, 115a to 115d Display part
151 Display controller

161 CPU
164 GPU
171 Information processing unit
181 Recognition unit
182 Detection unit
183 Video correction unit
184 Layout setting unit
185 Display control unit
201, 201a to 201c Display unit
211 CPU
212 Memory
215 Display controller
216 Display
219 Sensing unit
231 Information processing unit
241 Metadata generation unit
242 Transmission control unit
243 Display processing unit
261 Slide bar switch

The invention claimed is:

1. An information processing apparatus, comprising:
circuitry configured to:
   receive metadata of a plurality of display units of a self-luminous type, wherein
      the metadata includes an attribute of each display unit of the plurality of display units, a relative position of each display unit of the plurality of display units, and a pixel pitch of each display unit of the plurality of display units, and
      the plurality of display units comprises a display surface configured to display a video image;
   recognize a shape of the display surface based on the metadata of each display unit of the plurality of display units;
   recognize a pixel position of each display unit of the plurality of display units on the display surface based on the pixel pitch; and
   perform geometric correction on the video image, based on the shape of the display surface, the pixel position of the display surface, and a field of view of a user of the plurality of display units.

2. The information processing apparatus according to claim 1, wherein the metadata further includes:
   at least one of:
      identification information of each display unit of the plurality of display units,
      a shape of each display unit of the plurality of display units,
      a size of each display unit of the plurality of display units, or
      an absolute position of each display unit of the plurality of display units, and
      an angle between two display units of the plurality of display units.

3. The information processing apparatus according to claim 2, wherein the circuitry is further configured to recognize a three-dimensional shape of the display surface based on
   at least one of the shape, the size, the relative position or the absolute position of each display unit of the plurality of display units, and
   the angle between the two display units of the plurality of display units.

4. The information processing apparatus according to claim 3, wherein the circuitry is further configured to recognize a shape of a corner of the display surface, based on the angle between the two display units of the plurality of display units.

5. The information processing apparatus according to claim 3, wherein
   the metadata further includes one of a curvature or a curvature radius of each display unit of the plurality of display units, and
   the circuitry is further configured to recognize the three-dimensional shape of the display surface, having a curved surface, based on
      the shape, the size, the relative position, or the absolute position,
      the curvature or the curvature radius of each display unit of the plurality of display units, and
      the angle between the two display units of the plurality of display units.

6. The information processing apparatus according to claim 5, wherein
   the display surface has one of a spherical surface or the shape obtained by cutting out a part of the spherical surface, and
   the metadata further includes one of the curvature or the curvature radius in two orthogonal directions of each display unit of the plurality of display units.

7. The information processing apparatus according to claim 6, wherein
   the display surface is configured by placement of multiple triangular display units side by side, and
   each of the multiple triangular display units has a curved surface shape.

8. The information processing apparatus according to claim 2, wherein the circuitry is further configured to recognize the pixel position of the display surface, based on an area of each display unit of the plurality of display units on the display surface.

9. The information processing apparatus according to claim 1, wherein the circuitry is further configured to:
   detect a visual point of the user; and
   perform the geometric correction on the video image, based on
      the visual point of the user.

10. The information processing apparatus according to claim 9, wherein
   the circuitry is further configured to perform, based on the field of view of the user or the visual point of the user, the geometric correction on the video image by association of the pixel position of the display surface with a pixel position of the video image on a virtual plane, and
   the virtual plane is between the display surface and the user.

11. The information processing apparatus according to claim 10, wherein the circuitry is further configured to perform the geometric correction on video images for each of a left eye of the user and a right eye of the user, based on
   the shape and the pixel position of the display surface, and
   one of a viewpoint or a field of view of each of the left eye of the user and the right eye of the user.

12. The information processing apparatus according to claim 1, wherein the circuitry is further configured to set a layout of a plurality of video images on the display surface, based on a type of the plurality of video images and the shape of the display surface.

13. The information processing apparatus according to claim 12, wherein the circuitry is further configured to set the layout of the plurality of video images such that a two-dimensional video image among the plurality of video images does not overlap with a corner of the display surface.

14. The information processing apparatus according to claim 1, wherein the circuitry is further configured to individually receive the metadata from each display unit of the plurality of display units.

15. An information processing method, comprising:
receiving metadata of a plurality of display units of a self-luminous type, wherein
the metadata includes an attribute of each display unit of the plurality of display units, a relative position of each display unit of the plurality of display units, and a pixel pitch of each display unit of the plurality of display units, and
the plurality of display units comprises a display surface configured to display a video image;
recognizing a shape of the display surface based on the metadata of each display unit of the plurality of display units;
recognizing a pixel position of each display unit of the plurality of display units on the display surface based on the pixel pitch; and
performing geometric correction on the video image, based on the shape of the display surface, the pixel position of the display surface, and a field of view of a user of the plurality of display units.

16. A first display device, comprising:
a first display of a self-luminous type; and
circuitry configured to:
store metadata of the first display, wherein
the metadata includes an attribute of the first display, a relative position of the first display, and a specific pixel pitch of the first display;
connect the first display device to a second display device of a plurality of display devices; and
control transmission of the metadata to an information processing apparatus, wherein
the information processing apparatus:
recognizes a shape and a pixel position of a display surface, wherein the display surface displays a video image;
recognizes a pixel position of each display of a plurality of displays on the display surface, based on a pixel pitch of each display of the plurality of displays; and
performs geometric correction on the video image, based on the shape of the display surface, the pixel position of the display surface, and a field of view of a user of the first display device,
the display surface comprises the first display and a second display of the second display device, and
the plurality of displays includes the first display and the second display.

17. The first display device according to claim 16, wherein the metadata includes
at least one of
a shape of each of the first display and the second display,
a size of each of the first display and the second display,
a curvature of each of the first display and the second display, or
a curvature radius of each of the first display and the second display,
an absolute position of each of the first display and the second display,
an angle between the first display and the second display, wherein the first display is adjacent to the second display, and
identification information of the first display device.

18. The first display device according to claim 17, wherein the circuitry is further configured to;
set the identification information in cooperation with the second display device; and
store the identification information.

19. The first display device according to claim 17, wherein the circuitry is further configured to:
set the angle between the first display and the second display; and
store the set angle.

20. The first display device according to claim 17, wherein the circuitry is further configured to:
detect the angle between the first display and the second display; and
store the detected angle.

21. The first display device according to claim 17, wherein the circuitry is further configured to:
detect the relative position of the first display in cooperation with the second display device; and
store the detected relative position.

22. The first display device according to claim 16, wherein
a lenticular sheet is on a surface of the first display, and
the metadata includes an attribute of the lenticular sheet.

* * * * *